(12) United States Patent
Fortuna et al.

(10) Patent No.: US 8,924,436 B1
(45) Date of Patent: *Dec. 30, 2014

(54) POPULATING A STRUCTURED PRESENTATION WITH NEW VALUES

(71) Applicant: Google Inc., Mountain View, CA (US)

(72) Inventors: Vinicius J. Fortuna, New York, NY (US); Andriy Bihun, Pine Bush, NY (US); Leonardo A. Laroco, Jr., Philadelphia, PA (US); Daniel Loreto, New Rochelle, NY (US); Elena Erbiceanu, Orlando, FL (US); Jeffrey C. Reynar, New York, NY (US); Andrew William Hogue, Ho-Ho-Kus, NJ (US); Ankur Bhargava, Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,858

(22) Filed: Apr. 1, 2013

Related U.S. Application Data

(63) Continuation of application No. 12/355,459, filed on Jan. 16, 2009, now Pat. No. 8,412,749.

(51) Int. Cl.
  *G06F 17/30* (2006.01)
  *G06F 17/22* (2006.01)

(52) U.S. Cl.
  CPC .................................. *G06F 17/2247* (2013.01)
  USPC ......................................................... 707/811

(58) Field of Classification Search
  USPC ......................................................... 707/611
  See application file for complete search history.

(56) References Cited

U.S. PATENT DOCUMENTS

| | | | |
|---|---|---|---|
| 3,576,983 A | 5/1971 | Cochran | |
| 4,269,492 A | 5/1981 | Engelsmann et al. | |
| 4,374,381 A | 2/1983 | Ng et al. | |
| 4,797,569 A | 1/1989 | Boyacigiller | |
| 4,837,422 A | 6/1989 | Dethloff et al. | |
| 4,968,873 A | 11/1990 | Dethloff et al. | |
| 5,255,356 A | 10/1993 | Michelman et al. | |
| 5,257,353 A | 10/1993 | Blanck et al. | |

(Continued)

FOREIGN PATENT DOCUMENTS

WO   WO 01/19160   3/2001

OTHER PUBLICATIONS

A. Hogue and D. Karger, "Thresher: automating the unwrapping of semantic content from the World Wide Web," Proc. of WWW, pp. 86-95 (2005).

(Continued)

*Primary Examiner* — William Spieler
(74) *Attorney, Agent, or Firm* — Fish & Richardson P.C.

(57) ABSTRACT

Methods, systems, and apparatus, including computer programs stored on computer storage media, for populating a structured presentation with new values. One aspect can be embodied in machine-implemented methods that include the actions of obtaining a plurality of instances and a plurality of attributes; for each instance: identifying one or more documents from an unstructured document collection that are relevant to the instance, where each of the one or more documents include at least a value for an attribute in the plurality of attributes; and establishing a subset of the one or more values as characterizing the instance; and adding each instance, the respective attributes, and the respective subset of values to a structured data collection.

27 Claims, 13 Drawing Sheets

(56) References Cited

U.S. PATENT DOCUMENTS

| | | | |
|---|---|---|---|
| 5,263,126 A | 11/1993 | Chang |
| 5,293,319 A | 3/1994 | DeSha et al. |
| 5,308,303 A | 5/1994 | Rawls et al. |
| 5,321,750 A | 6/1994 | Nadan |
| 5,347,580 A | 9/1994 | Molva et al. |
| 5,381,349 A | 1/1995 | Winter et al. |
| 5,387,170 A | 2/1995 | Rawls et al. |
| 5,396,588 A | 3/1995 | Froessl |
| 5,448,717 A | 9/1995 | Balmer et al. |
| 5,473,732 A | 12/1995 | Chang |
| 5,494,097 A | 2/1996 | Straub et al. |
| 5,499,366 A | 3/1996 | Rosenberg et al. |
| 5,560,006 A | 9/1996 | Layden et al. |
| 5,577,510 A | 11/1996 | Chittum et al. |
| 5,586,252 A | 12/1996 | Barnard et al. |
| 5,634,054 A | 5/1997 | Sarachan |
| 5,671,326 A | 9/1997 | Geisow et al. |
| 5,682,035 A | 10/1997 | Gallagher et al. |
| 5,694,608 A | 12/1997 | Shostak |
| 5,696,962 A | 12/1997 | Kupiec |
| 5,768,158 A | 6/1998 | Adler et al. |
| 5,805,164 A | 9/1998 | Blum et al. |
| 5,812,995 A * | 9/1998 | Sasaki et al. ............... 1/1 |
| 5,870,749 A | 2/1999 | Adusumilli |
| 5,893,125 A | 4/1999 | Shostak |
| 5,923,330 A | 7/1999 | Tarlton et al. |
| 6,003,027 A | 12/1999 | Prager |
| 6,057,935 A | 5/2000 | Freeman |
| 6,122,647 A | 9/2000 | Horowitz et al. |
| 6,285,999 B1 | 9/2001 | Page |
| 6,298,357 B1 | 10/2001 | Wexler et al. |
| 6,304,259 B1 | 10/2001 | DeStefano |
| 6,424,976 B1 | 7/2002 | Jarvis et al. |
| 6,446,099 B1 | 9/2002 | Peairs |
| 6,476,827 B1 | 11/2002 | Porter |
| 6,564,213 B1 | 5/2003 | Ortega et al. |
| 6,574,628 B1 | 6/2003 | Kahn et al. |
| 6,647,383 B1 | 11/2003 | August et al. |
| 6,681,370 B2 | 1/2004 | Gounares et al. |
| 6,687,689 B1 | 2/2004 | Fung et al. |
| 6,694,307 B2 | 2/2004 | Julien et al. |
| 6,704,727 B1 | 3/2004 | Kravets |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,826,443 B2 | 11/2004 | Makinen |
| 6,945,458 B1 | 9/2005 | Shah et al. |
| 7,123,974 B1 | 10/2006 | Hamilton |
| 7,225,197 B2 | 5/2007 | Lissar et al. |
| 7,281,245 B2 | 10/2007 | Reynar et al. |
| 7,325,194 B2 | 1/2008 | Moore et al. |
| 7,346,629 B2 | 3/2008 | Kapur et al. |
| 7,356,537 B2 | 4/2008 | Reynar et al. |
| 7,370,072 B2 | 5/2008 | Jessen |
| 7,392,479 B2 | 6/2008 | Jones et al. |
| 7,398,201 B2 | 7/2008 | Marchisio et al. |
| 7,409,393 B2 | 8/2008 | Gregoire et al. |
| 7,415,460 B1 | 8/2008 | Phillips et al. |
| 7,421,645 B2 | 9/2008 | Reynar |
| 7,526,425 B2 | 4/2009 | Marchisio et al. |
| 7,526,486 B2 | 4/2009 | Cushman, II et al. |
| 7,558,841 B2 | 7/2009 | Taboada et al. |
| 7,562,104 B2 | 7/2009 | Cadiz et al. |
| 7,593,925 B2 | 9/2009 | Cadiz et al. |
| 7,672,932 B2 | 3/2010 | Hood et al. |
| 7,707,024 B2 | 4/2010 | Arayasantiparb et al. |
| 7,707,496 B1 | 4/2010 | Moore et al. |
| 7,707,505 B1 | 4/2010 | Ohrt et al. |
| 7,711,550 B1 | 5/2010 | Feinberg et al. |
| 7,712,024 B2 | 5/2010 | Reynar et al. |
| 7,716,163 B2 | 5/2010 | Reynar et al. |
| 7,716,676 B2 | 5/2010 | Sawicki et al. |
| 7,734,606 B2 | 6/2010 | Walker |
| 7,739,588 B2 | 6/2010 | Reynar et al. |
| 7,742,048 B1 | 6/2010 | Moore et al. |
| 7,770,102 B1 | 8/2010 | Wolff et al. |
| 7,778,816 B2 | 8/2010 | Reynar |
| 7,783,614 B2 | 8/2010 | Jones et al. |
| 7,788,590 B2 | 8/2010 | Taboada et al. |
| 7,788,602 B2 | 8/2010 | Reynar et al. |
| 7,792,818 B2 | 9/2010 | Fain et al. |
| 7,814,084 B2 | 10/2010 | Hallett et al. |
| 7,827,164 B2 | 11/2010 | Stevenson |
| 7,827,546 B1 | 11/2010 | Jones et al. |
| 7,836,044 B2 | 11/2010 | Kamvar et al. |
| 7,840,604 B2 | 11/2010 | Zhu et al. |
| 7,849,048 B2 | 12/2010 | Langseth et al. |
| 7,849,049 B2 | 12/2010 | Langseth et al. |
| 7,865,478 B2 | 1/2011 | Badovinatz et al. |
| 7,895,175 B2 | 2/2011 | Kumar |
| 7,912,816 B2 | 3/2011 | Guha et al. |
| 7,962,480 B1 | 6/2011 | Zhang et al. |
| 7,966,291 B1 * | 6/2011 | Petrovic et al. ............... 707/641 |
| 7,992,085 B2 | 8/2011 | Wang-Aryattanwanich et al. |
| 8,412,749 B2 | 4/2013 | Fortuna et al. |
| 2001/0025353 A1 | 9/2001 | Jakel |
| 2001/0032234 A1 | 10/2001 | Summers et al. |
| 2002/0032671 A1 | 3/2002 | Linuma |
| 2002/0107853 A1 | 8/2002 | Hofmann et al. |
| 2002/0111951 A1 | 8/2002 | Zen |
| 2002/0129011 A1 | 9/2002 | Julien |
| 2002/0156771 A1 | 10/2002 | Frieder et al. |
| 2002/0187815 A1 | 12/2002 | Deeds et al. |
| 2002/0194166 A1 | 12/2002 | Fowler |
| 2003/0014441 A1 | 1/2003 | Suzuki et al. |
| 2003/0016943 A1 | 1/2003 | Chung et al. |
| 2003/0033275 A1 | 2/2003 | Alpha et al. |
| 2003/0037050 A1 | 2/2003 | Monteverde |
| 2003/0101052 A1 | 5/2003 | Chen et al. |
| 2003/0120681 A1 | 6/2003 | Baclawski |
| 2003/0145004 A1 | 7/2003 | Egilsson et al. |
| 2003/0188009 A1 | 10/2003 | Agarwalla et al. |
| 2003/0206201 A1 | 11/2003 | Ly |
| 2003/0220913 A1 | 11/2003 | Doganata et al. |
| 2004/0019536 A1 | 1/2004 | Ashkenazi et al. |
| 2004/0083433 A1 | 4/2004 | Takeya |
| 2004/0093321 A1 | 5/2004 | Roustant et al. |
| 2004/0103116 A1 | 5/2004 | Palanisamy et al. |
| 2004/0117436 A1 | 6/2004 | Newman et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0167921 A1 | 8/2004 | Carson et al. |
| 2004/0181543 A1 | 9/2004 | Wu et al. |
| 2004/0186826 A1 | 9/2004 | Chol et al. |
| 2004/0194009 A1 | 9/2004 | LaComb et al. |
| 2004/0215634 A1 | 10/2004 | Wakefield et al. |
| 2004/0243560 A1 | 12/2004 | Broder et al. |
| 2005/0055337 A1 | 3/2005 | Bebo et al. |
| 2005/0076015 A1 | 4/2005 | Dettinger et al. |
| 2005/0080771 A1 | 4/2005 | Fish |
| 2005/0086215 A1 | 4/2005 | Perisic |
| 2005/0102259 A1 | 5/2005 | Kapur |
| 2005/0108256 A1 | 5/2005 | Wakefield et al. |
| 2005/0132274 A1 | 6/2005 | Bodin et al. |
| 2005/0240984 A1 | 10/2005 | Farr et al. |
| 2005/0289170 A1 | 12/2005 | Brown et al. |
| 2006/0004716 A1 | 1/2006 | Hurst-Hiller et al. |
| 2006/0053383 A1 | 3/2006 | Gauthier et al. |
| 2006/0074859 A1 | 4/2006 | Gange et al. |
| 2006/0074868 A1 | 4/2006 | Khaliq et al. |
| 2006/0095447 A1 | 5/2006 | Dickinson et al. |
| 2006/0129446 A1 | 6/2006 | Ruhl et al. |
| 2006/0190436 A1 | 8/2006 | Richardson et al. |

(56) References Cited

U.S. PATENT DOCUMENTS

| | | | |
|---|---|---|---|
| 2007/0011183 A1 | 1/2007 | Langseth et al. | |
| 2007/0078850 A1 | 4/2007 | Aziz et al. | |
| 2007/0150800 A1* | 6/2007 | Betz et al. | 715/500 |
| 2007/0203891 A1 | 8/2007 | Solaro et al. | |
| 2007/0244859 A1 | 10/2007 | Trippe et al. | |
| 2007/0276845 A1 | 11/2007 | Geilich | |
| 2007/0282783 A1 | 12/2007 | Singh | |
| 2007/0299855 A1* | 12/2007 | Levin | 707/101 |
| 2008/0097985 A1 | 4/2008 | Olstad et al. | |
| 2008/0114795 A1 | 5/2008 | Agrawal et al. | |
| 2008/0126430 A1 | 5/2008 | Garrett et al. | |
| 2008/0162456 A1 | 7/2008 | Daga et al. | |
| 2008/0228675 A1 | 9/2008 | Duffy et al. | |
| 2008/0256023 A1 | 10/2008 | Nair | |
| 2008/0301097 A1 | 12/2008 | Parkinson | |
| 2010/0161661 A1 | 6/2010 | Hood et al. | |
| 2010/0185651 A1 | 7/2010 | Crow et al. | |
| 2010/0185653 A1 | 7/2010 | Fortuna et al. | |
| 2010/0185654 A1 | 7/2010 | Fortuna et al. | |
| 2010/0185666 A1 | 7/2010 | Crow et al. | |
| 2010/0185934 A1 | 7/2010 | Fortuna et al. | |
| 2010/0306223 A1 | 12/2010 | Lee et al. | |
| 2011/0106819 A1 | 5/2011 | Brown et al. | |

OTHER PUBLICATIONS

A. Sugiura and Y. Koseki, "Internet Scrapbook: automating Web browsing tasks by demonstration," Proc. of UIST, pp. 9-18 (1998).
A. Y. Halevy, A. Rajaraman, and J. J. Ordille. "Data integration: The teenage years," Proc. of VLDB, pp. 9-16 (2006).
B. Amento, L. Terveen, and W. Hill, Experiments in social data mining: The TopicShop system. ACM Trans. on Computer-Human Interaction, pp. 54-85 (2003).
Barbara et al., Interoperability with unstructured data and services, Research Issues in Data Engineering, 1993: Interoperability in Multidatabase Systems, 1993. Proceedings RIDE-IMS '93, Third International Workshop on, Apr. 19-20, 1993, pp. 123-125.
Biskup, J.; and D.W. Embley , Extracting Information from Heterogeneous Information Sources Using Ontologically Specified Target Views, Information Systems, vol. 28, No. 3, 2003, 169-212.
Botafogo, R. A., "Cluster analysis for hypertext systems," In Proceedings of the 16th Annual International ACM SIGIR Conference on Research and Development in information Retrieval (Pittsburgh, Pennsylvania, United States, Jun. 27-Jul. 1, 1993). R. Korfhage, E. Rasmussen, and P. Willett, Eds. SIGIR '93. ACM Press, New York, NY, 116-125.
Breiman et al, "Classification and Regression Trees." Chapman & Hall (Wadsworth, Inc.), New York (1984).
Breiman, Leo., Random Forests., Machine Learning, vol. 45:1. (2001), pp. 1-32.
Card, S.; G. Roberston, and W. York, "The WebBook and the Web Forager: An information workspace for theWorld-WideWeb," Proc. of SIGCHI, pp. 111-117 (1996).
Dempster, et al., Maximum Likelihood from Incomplete Data via the EM Algorithm., Rubin Journal of the Royal Statistical Society, Series B (Methodological) 39 (1) pp. 1-37 (1977).
Dontcheva, M., Drucker, S., Salesin, D., Cohen, M., "Relations, Cards, and Search Templates: User-Guided Data Integration and Layout," UIST '07, pp. 61-70 (Oct. 7-10, 2007).
Dontcheva, M., S. M. Drucker, G.Wade, D. Salesin, and M. F. Cohen, "Summarizing personal Web browsing sessions," Proc. of UIST, pp. 115-124 (2006).
Embley , D.W., D.M. Campbell, and R.D. Smith , Ontology-Based Extraction and Structuring of Information from Data-Rich Unstructured Documents, CIKM'98 Proceedings (http://www.deg.byu.edu/papers/cikm98.pdf).
Embley , D.W., D.M. Campbell, Y.S. Jiang, Y.-K. Ng, R.D. Smith, S.W. Liddle, and D.W. Quass. A Conceptual-Modeling Approach to Extracting Data from the Web, ER'98 Proceedings (http://www.deg.byu.edu/papers/er98.pdf).

Embley , D.W., and L. Xu , Record Location and Reconfiguration in Unstructured Multiple-Record Web Documents, WebDB'00 Proceedings (http://www.deg.byu.edu/papers/WebDB00.ps.
Embley , D.W., S.W. Liddle, D. Lonsdale, G. Nagy, Y. Tijerino, R. Clawson, J. Crabtree, Y. Ding, P. Jha, Z. Lian, S. Lynn, R.K. Padmanabhan, J. Peters, C. Tao, R. Watts, C. Woodbury, and A. Zitzelberger, A Conceptual-Model-Based Computational Alembic for a Web of Knowledge, ER2008, Oct. 2008. (http://www.deg.byu.edu/papers/dke99.pdf).
Embley , D.W., Y.-K. Ng, and L. Xu , Recognizing Ontology-Applicable Multiple-Record Web Documents, Proceedings of the 20th International Conference on Conceptual Modeling (er2001), Yokohama, Japan, Nov. 27-30, 2001.
Huynh, D.; S. Mazzocchi, and D. Karger, "Piggy Bank: Experience the semantic web inside your Web browser," Proc. of ISWC, pp. 413-430 (2005).
International Search Report as issued in PCT/US2010/021290 on Sep. 3, 2010.
International Search Report as issued in PCT/US2010/036949 on Jan. 24, 2011.
International Search Report as issued in PCT/US2006/25810 on Jul. 27, 2007.
International Search Report as issued in PCT/US2006/25811 on Feb. 16, 2007.
Irmak, U.; and T. Suel, "Interactive wrapper generation with minimal user effort," Proc. of WWW, pp. 553-563 (2006).
Kristjansson, T.; A. Culotta, P. Viola, and A. McCallum, "Interactive information extraction with constrained conditional random fields," Proc. of AAAI, pp. 412-418 (2004).
Madhavan, J.; S. Cohen, X. L. Dong, A. Y. Halevy, S. R. Jeffery, D. Ko, and C. Yu, "Web-scale data integration: You can afford to pay as you go," Proc. of CIDR, pp. 342-350 (2007).
Modha, D. S. and Spangler, "Clustering hypertext with applications to web searching," In Proceedings of the Eleventh ACM on Hypertext and Hypermedia (San Antonio, Texas, United States, May 30-Jun. 3, 2000), HYPERTEXT '00. ACM Press, New York, NY, 143-152. DOI= http://doi.acm.org/10.1145/336296.336351.
Office Action as issued in U.S. Appl. No. 12/355,459, filed Mar. 25, 2011.
Office Action as issued in U.S. Appl. No. 12/355,554, filed May 11, 2011.
Chu et al., "A Relational Approach to Inrementally Extracting and Querying Structure Data," VLDB'07, Sep. 23-27, 2007.
Office Action as issued in U.S. Appl. No. 12/355,607, filed Mar. 1, 2011.
Office Action as issued in U.S. Appl. No. 12/355,228, filed Jan. 5, 2011.
Office Action as issued in U.S. Appl. No. 12/355,103, filed May 2, 2011.
Office Action as issued in U.S. Appl. No. 12/355,459, filed Nov. 7, 2011.
Office Action as issued in U.S. Appl. No. 12/355,607, filed Nov. 1, 2011.
Office Action as issued in U.S. Appl. No. 12/355,228, filed Aug. 4, 2011.
Office Action as issued in U.S. Appl. No. 12/476,110, filed Aug. 4, 2011.
Pasca, et al., The Role of Documents vs. Queries in Extracting Class Attributes from Text., CIKM'07, Nov. 6-8, 2007, Lisboa, Portugal, pp. 485-493.
Pasca, et al., Weakly-Supervised Acquisition of Open-Domain Classes and Class Attributes fromWeb Documents and Query Logs., Proceedings of ACL-08: HLT, pp. 19-27, Columbus, Ohio, USA, Jun. 2008.
Robertson, G.; M. Czerwinski, K. Larson, D. Robbins, D. Thiel, and M. van Dantzich, "Data mountain: using spatial memory for document management," Proc. of UIST, pp. 153-162 (1998).
Schraefel, M.; Y. Zhu, D. Modjeska, D. Wigdor, and S. Zhao, "Hunter Gatherer: interaction support for the creation and management of within-web-page collections," Proc. of WWW, pp. 172-181 (2002).
Steinberg et al., Salford Systems, San Diego, Calif., USA (1995).

(56) References Cited

OTHER PUBLICATIONS

Tokunaga, K. et al., "Automatic Discovery of Attribute Words from Web Documents," R. Dale et al. (Eds.): IJCNLP 2005, LNAI 3651, pp. 106-118, 2005, Springer-Verlag, Berlin, Heidelberg 2005.

Viola P., and M. Narasimhan, "Learning to extract information from semi-structured text using a discriminative context free grammar," Proc. of SIGIR, pp. 330-337 (2005).

Westermann et al., "The VSBUFFER: Visibility Ordering of Unstructured Volume Primitives by Polygon Drawing," (1997) (http://citeseerx.ist.psu.edu/viewdoc/download;jsessionid=08847506 C7710C023D15EC672071DE58?doi=10.1.1.29.9614&rep=rep1 &type=pdf).

Xiaofeng He; Chris H.Q. Ding, Hongyuan Zha, and Horst D. Simon, "Automatic topic identification using webpage clustering," Data Mining, 2001. ICDM 2001, Proceedings IEEE International Conference on Data Mining, pp. 195-202.

Ye, S.; T.-S. Chua, J. Kei, "Querying and Clustering Web Pages about Persons and Organizations," Proceedings of the IEEE/WIC International Conference on Web Intelligence (WI'03) (2003).

Extended European Search Report as issued in Application No. 10732191.1 on May 14, 2013, 6 pages.

ZimZalaBim, "Web Search Engine," Wikipedia, the free encyclopedia, Jan. 13, 2009 [online], [retrieved on May 3, 2013]. Retrieved from the Internet URL: http://en.wikipedia.org/w/index.php?title=Web_search_engine&oldid=263824777, 5 pages.

Authorized officer Philippe Bécamel, International Preliminary Report on Patentability in PCT/US2010/021290, mailed Jul. 28, 2011, 6 pages.

Authorized officer Athina Nickitas-Etienne, International Preliminary Report on Patentability in PCT/US2010/036949, mailed Dec. 15, 2011, 6 pages.

Nishino, Fumihito et al., Person and Organization Information Extraction from Newspaper, Information Processing Society of Japan Technical Report, vol. 98, No. 81, Japan, Information Processing Society of Japan, Sep. 18, 1998, pp. 125-132 (English abstract).

Kimura, Rui et al., Generating a dictionary about people based on automatic collection of timeline information, IEICE Technical Report, vol. 106, No. 149, DE2006-50-91, Data Engineering, Japan, The Institute of Electronics, Information and Communication Engineers, Jul. 6, 2006, pp. 41-46 (English abstract).

Yamamoto, Ayumi et al., Automatic Collection of People's Information from the World Wide Web, IEICE Technical Report, vol. 99, No. 534, AI99-77-89, Artificial Intelligence and Knowledge Processing, Japan, The Institute of Electronics, Information and Communication Engineers, Jan. 13, 2000, pp. 93-100 (English abstract).

Japanese Office Action in Japanese Application No. 2011-546411, mailed on Feb. 17, 2014, 9 pages (with English translation).

* cited by examiner

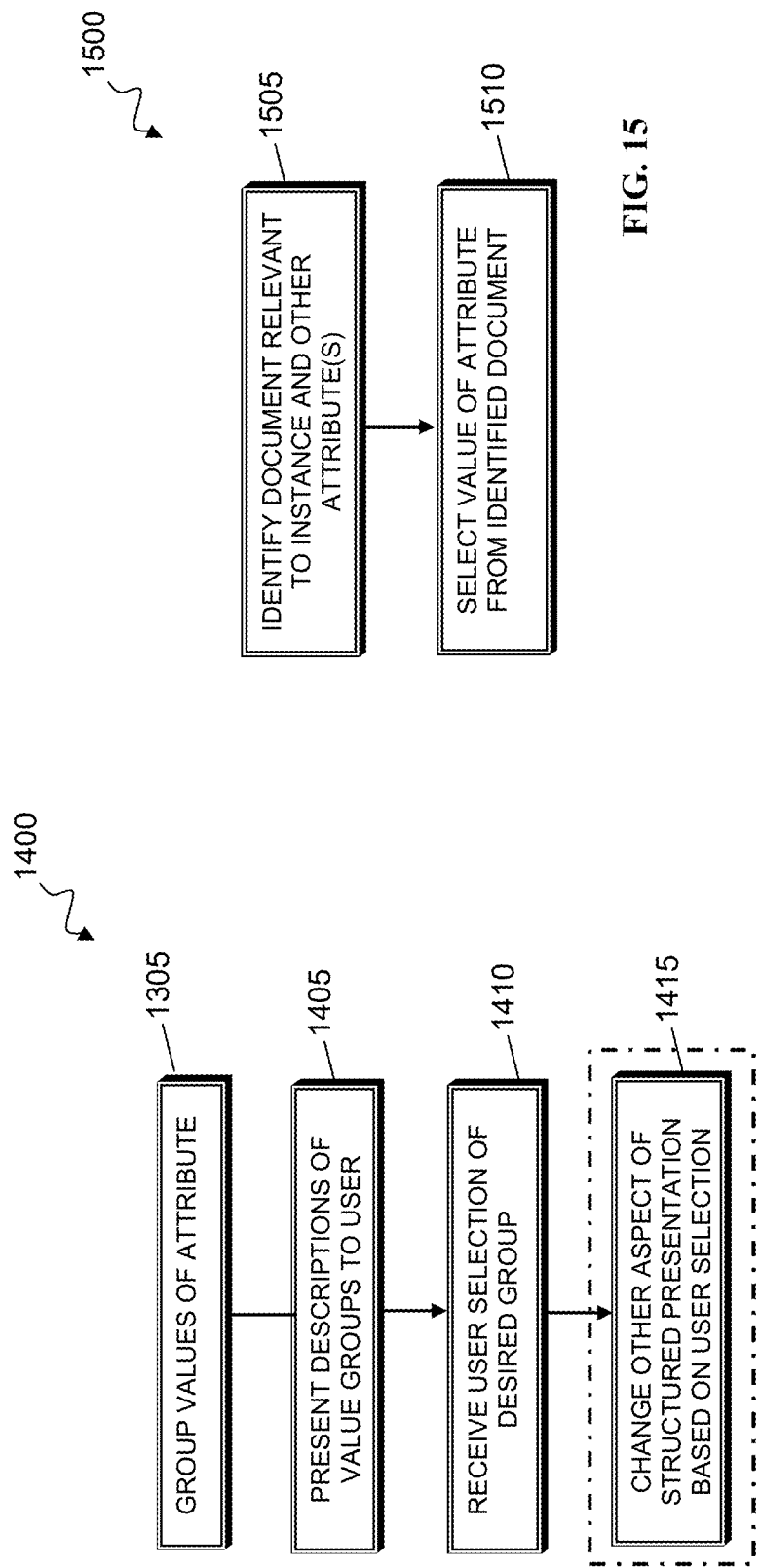

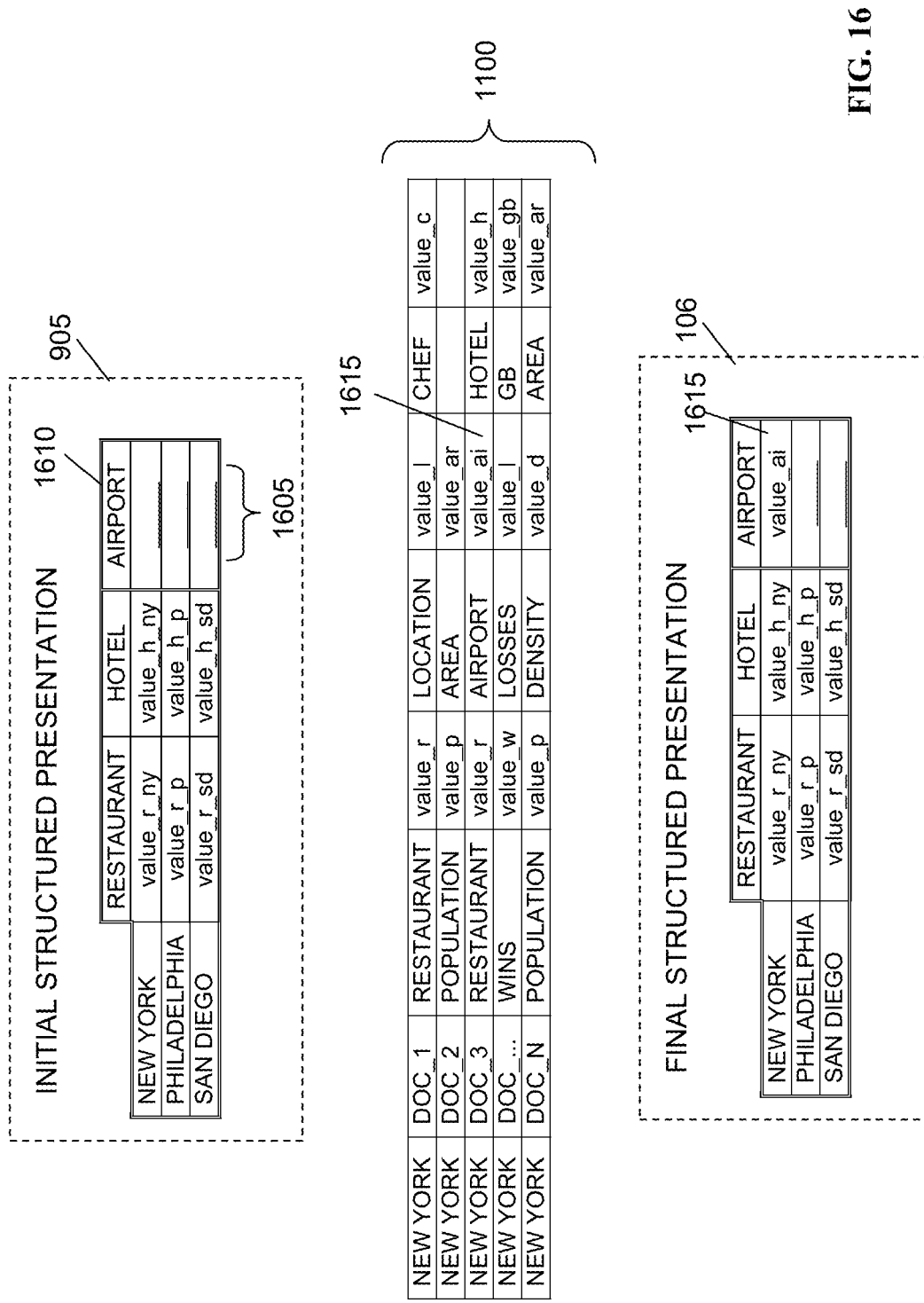

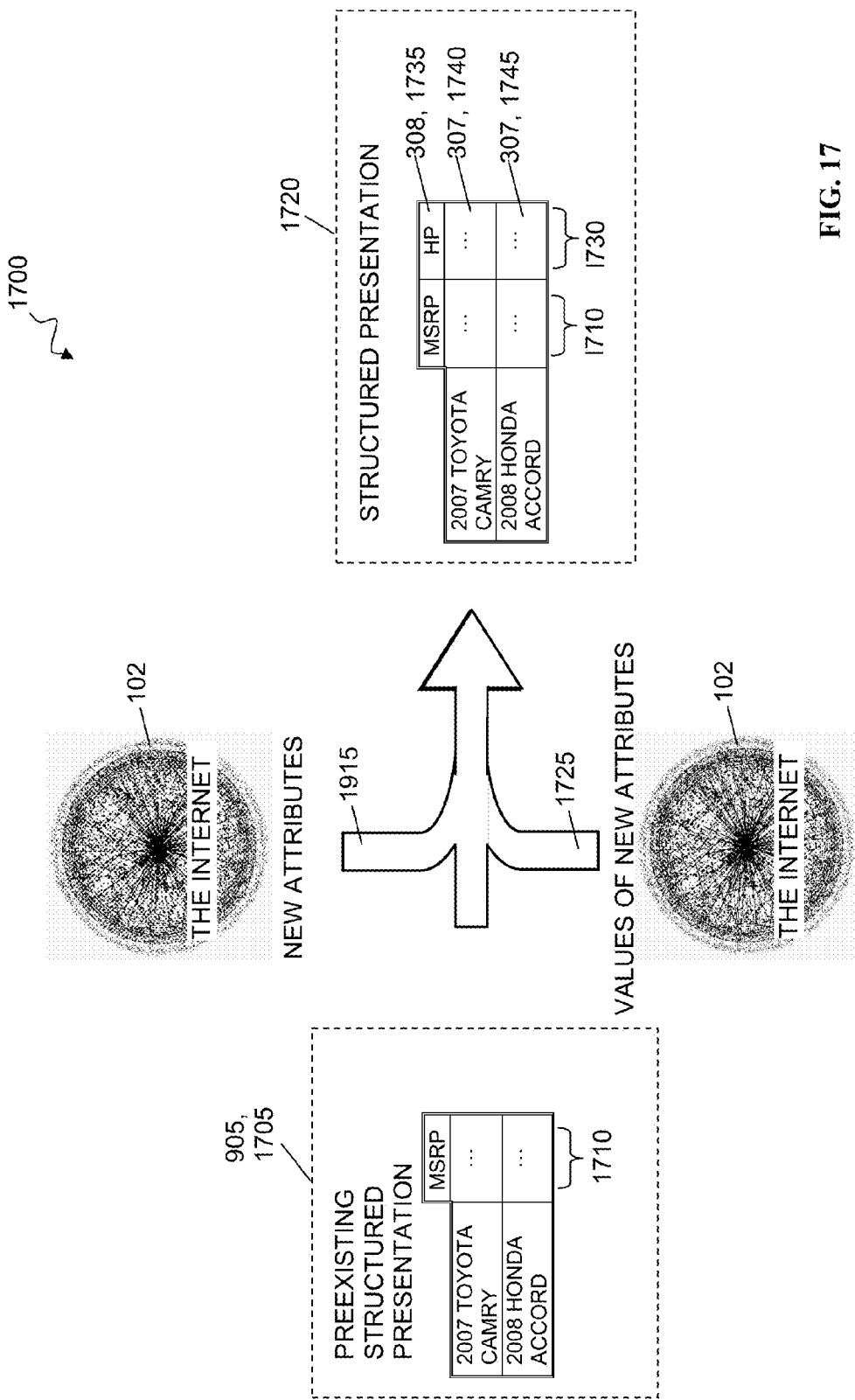

US 8,924,436 B1

POPULATING A STRUCTURED PRESENTATION WITH NEW VALUES

REFERENCE TO OTHER APPLICATIONS

This application is a continuation of and claims priority to U.S. patent application Ser. No. 12/355,459, filed on Jan. 16, 2009, the entire contents of which are hereby incorporated by reference.

This specification refers to the commonly-owned U.S. Patent applications entitled "ADDING NEW INSTANCES TO A STRUCTURED PRESENTATION" (U.S. patent application Ser. No. 13/355,554), "ADDING NEW ATTRIBUTES TO A STRUCTURED PRESENTATION" (U.S. patent application Ser. No. 13/355,607), "RETRIEVING AND DISPLAYING INFORMATION FROM AN UNSTRUCTURED ELECTRONIC DOCUMENT COLLECTION" (U.S. patent application Ser. No. 13/355,228), and "EMBEDDING A CONCEALED SEARCH INTERFACE IN A STRUCTURED PRESENTATION" (U.S. patent application Ser. No. 13/355,103), the contents of all of which are incorporated herein by reference.

BACKGROUND

This specification relates to the population of a structured presentation with new values by retrieving and displaying information from an unstructured electronic document collection.

An electronic document is a collection of machine-readable data. Electronic documents are generally individual files and are formatted in accordance with a defined format (e.g., PDF, TIFF, HTML, ASCII, MS Word, PCL, PostScript, or the like). Electronic documents can be electronically stored and disseminated. In some cases, electronic documents include audio content, visual content, and other information, as well as text and links to other electronic documents.

Electronic document can be collected into electronic document collections. Electronic document collections can either be unstructured or structured. The formatting of the documents in an unstructured electronic document collection is not constrained to conform with a predetermined structure and can evolve in often unforeseen ways. In other words, the formatting of individual documents in an unstructured electronic document collection is neither restrictive nor permanent across the entire document collection. Further, in an unstructured electronic document collection, there are no mechanisms for ensuring that new documents adhere to a format or that changes to a format are applied to previously existing documents. Thus, the documents in an unstructured electronic document collection cannot be expected to share a common structure that can be exploited in the extraction of information. Examples of unstructured electronic document collections include the documents available on the Internet, collections of resumes, collections of journal articles, and collections of news articles. Documents in some unstructured electronic document collections are not prohibited from including links to other documents inside and outside of the collection.

In contrast, the documents in structured electronic document collections generally conform with formats that can be both restrictive and permanent. The formats imposed on documents in structured electronic document collections can be restrictive in that common formats are applied to all of the documents in the collections, even when the applied formats are not completely appropriate. The formats can be permanent in that an upfront commitment to a particular format by the party who assembles the structured electronic document collection is generally required. Further, users of the collections—in particular, programs that use the documents in the collection—rely on the documents' having the expected format. As a result, format changes can be difficult to implement. Structured electronic document collections are best suited to applications where the information content lends itself to simple and stable categorizations. Thus, the documents in a structured electronic document collection generally share a common structure that can be exploited in the extraction of information. Examples of structured electronic document collections include databases that are organized and viewed through a database management system (DBMS) in accordance with hierarchical and relational data models, as well as a collections of electronic documents that are created by a single entity for presenting information consistently. For example, a collection of web pages that are provided by an online bookseller to present information about individual books can form a structured electronic document collection. As another example, a collection of web pages that is created by server-side scripts and viewed through an application server can form a structured electronic document collection. Thus, one or more structured electronic document collections can each be a subset of an unstructured electronic document collection.

SUMMARY

This specification describes technologies relating to retrieval and display of information from an unstructured electronic document collection, for example, the electronic documents available on the Internet. Although an electronic document collection may be unstructured, the information content of the unstructured electronic document collection can be displayed in a structured presentation. In particular, the information content of an unstructured electronic document collection can be used not only to determine the values of attributes but also to identify, select, and name attributes and instances in a structured presentation. Such structured presentations can present information in a coherent manner to a user despite the diversity in sources. Examples of structured presentations include tables and other collections of records.

In general, one aspect of the subject matter described in this specification can be embodied in machine-implemented methods that include the actions of receiving description data describing a preexisting structured presentation, comparing characteristics of the preexisting structured presentation with content of electronic documents in an unstructured collection of electronic documents to locate electronic documents that identify a new value that is relevant to the preexisting structured presentation, adding the new value to the preexisting structured presentation to form a new structured presentation, and outputting instructions for visually presenting the new structured presentation. A visual presentation of the preexisting structured presentation visually presenting information in an systematic arrangement that conforms with a structured design. The structured presentation denotes associations between an instance and values that characterize attributes of the instance by virtue of an arrangement of an identifier of the instance and the values in a visual presentation of the structured presentation.

This and other aspects can include one or more of the following features. An identifier of a first instance that appears in the structured presentation in a first electronic document can be located and the new value can be extracted from the first electronic document. The adding of the new value can include identifying a collection of values of a first attribute of a first instance and establishing a subset of one or more of the identified values as suitably characterizing the first attribute of the first instance. Establishing the subset of values as suitable can include one or more of the following: grouping the values in the collection into groups; selecting the subset based at least in part on a count of values in the subset; selecting the subset based at least in part on values in the subset meeting a user-specified constraint; selecting the subset based at least in part on a value in the subset being drawn from a high quality document; selecting the subset based at least in part on a value in the subset being drawn from a document relevant to another instance in the preexisting structured presentation; and selecting the subset based at least in part on a value in the subset being drawn from a document relevant to another attribute in the preexisting structured presentation.

The collection of electronic documents can be the Internet and the electronic documents can be web pages. The preexisting structured presentation can include a table or a collection of cards. The method can include visually presenting the new structured presentation on a display screen, including physically transforming one or more elements of the display screen.

Other embodiments of this aspect include corresponding systems, apparatus, and computer program products.

Another aspect of the subject matter described in this specification can be embodied in an apparatus comprising one or more machine-readable data storage media storing instructions operable to cause one or more data processing machines to perform operations. The operations can include receiving description data describing a first instance, a second instance, and a first attribute, extracting a first collection of values of the first attribute of the first instance from two or more documents of an unstructured electronic document collection, extracting a second collection of values of the first attribute of the second instance from two or more documents of the unstructured electronic document collection, establishing a first subset of the first collection of values as suitably characterizing the first attribute of the first instance, establishing a second subset of the second collection of values as suitably characterizing the first attribute of the second instance, and generating machine-readable instructions for displaying a structured presentation including a first value of the first subset and a second value of the second subset. The structured presentation denotes associations between instances and values that characterize attributes of the instanced by virtue of an arrangement of an identifier of the instance and the values.

This and other aspects can include one or more of the following features. The first subset of values can be established as suitable by grouping the values in the first collection into groups, wherein each group includes a subset of the first collection of values. The first subset of values can be established as suitable by selecting the first subset based at least in part on a count of values in the first subset. The first subset of values can be established as suitable by comparing the values in the first subset with a user-specified constraint on the values.

The first subset of values can be established as suitable by determining that a value in the first subset is drawn from a high quality document. The first subset of values can be established as suitable by determining that a value in the first subset is drawn from a document relevant to the second instance. The first subset of values can be established as suitable by determining that a value in the first subset is drawn from a document relevant to another attribute that characterizes both the first instance and the second instance.

The description of the first instance can include an identifier of the first instance that appears in a preexisting structured presentation. The description of the second instance can include an identifier of the second instance that appears in the preexisting structured presentation. The description of the first attribute can include a description of a new attribute that is to be added to a preexisting structured presentation. The apparatus of claim 15, wherein the unstructured electronic document collection can include electronic documents available on the Internet.

The structured presentation can be a table or a collection of cards. The structured presentation can be visually presented on a display screen, including physically transforming one or more elements of the display screen.

Other embodiments of this aspect include corresponding systems, apparatus, and methods.

Another aspect of the subject matter described in this specification can be embodied in a system that includes a device and one or more computers programmed to interact with the device and to perform operations. The operations include receiving description data describing a preexisting structured presentation, comparing characteristics of the preexisting structured presentation with content of electronic documents in an unstructured collection of electronic documents to locate electronic documents that identify a new value that is relevant to the preexisting structured presentation, adding the new value to the preexisting structured presentation to form a new structured presentation, and outputting instructions for visually presenting the new structured presentation to the device. A visual presentation of the preexisting structured presentation visually presents information in an systematic arrangement that conforms with a structured design. The structured presentation denotes associations between an instance and values that characterize attributes of the instance by virtue of an arrangement of an identifier of the instance and the values in a visual presentation of the structured presentation.

Other embodiments of this aspect include corresponding computer program products, apparatus, and methods.

Another aspect of the subject matter described in this specification can be embodied in a system that includes a device and one or more computers programmed to interact with the device and to perform operations. The operations include receiving description data describing a first instance, a second instance, and a first attribute, extracting a first collection of values of the first attribute of the first instance from two or more documents of an unstructured electronic document collection, extracting a second collection of values of the first attribute of the second instance from two or more documents of the unstructured electronic document collection, establishing a first subset of the first collection of values as suitably characterizing the first attribute of the first instance, establishing a second subset of the second collection of values as suitably characterizing the first attribute of the second instance, generating machine-readable instructions for displaying a structured presentation including a first value of the first subset and a second value of the second subset, wherein the structured presentation denotes associations between instances and values that characterize attributes of the instanced by virtue of an arrangement of an identifier of the instance and the values, and sending the machine-readable instructions to the device.

Other embodiments of this aspect include corresponding computer program products, apparatus, and methods.

The details of one or more implementations are set forth in the accompanying drawings and the description below. Other

DESCRIPTION OF DRAWINGS

FIG. 14 is a flow chart of a process for selecting one or more values for presentation in a structured presentation.

FIG. 15 is a flow chart of an example process for selecting one or more values for presentation in a structured presentation.

FIG. 16 is a schematic representation of a circumstance in which attribute values drawn from electronic documents in electronic document collection are presented to a user in a structured presentation.

FIG. 17 is a schematic representation of a process in which both attributes and attribute values are drawn from electronic documents in an electronic document collection and presented to a user in a structured presentation.

Like reference symbols in the various drawings indicate like elements.

DETAILED DESCRIPTION

Figure 1:
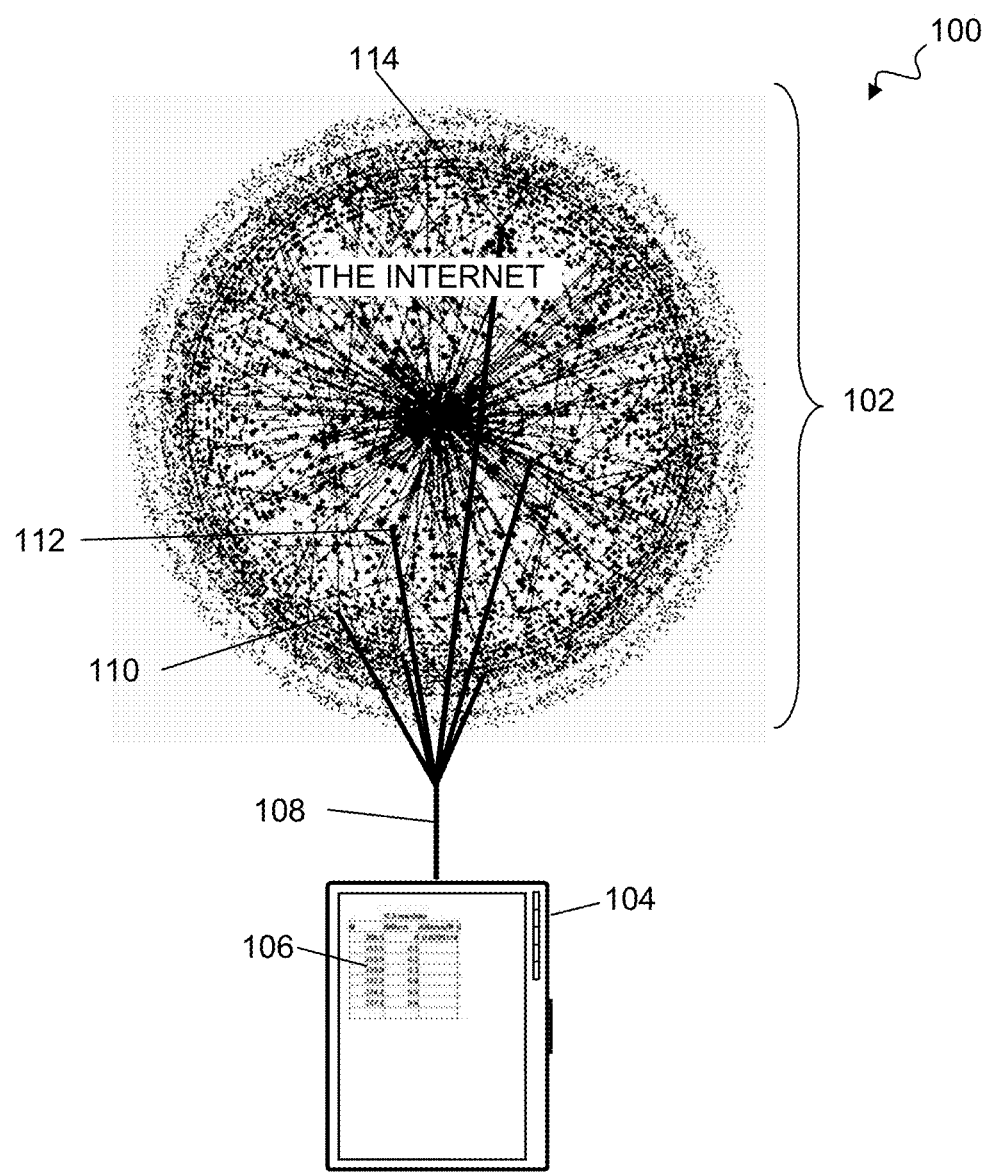
FIG. 1 is a schematic representation of a system in which information from an electronic document collection is presented to a user in a structured presentation.

FIG. 1 is a schematic representation of a system 100 in which information from an unstructured electronic document collection 102 is presented to a user in a structured presentation 106. In addition to electronic document collection 102, system 100 includes a display screen 104 and a data communication infrastructure 108. In operation, system 100 extracts information from unstructured collection of electronic documents 102 and presents the extracted information in a structured presentation 106 on display screen 104.

Electronic document collection 102 is unstructured in that the organization of information within individual documents in electronic document collection 102 need not conform with a predetermined structure that can be exploited in the extraction of information. For example, consider three electronic documents in electronic document collection 102, namely, electronic documents 110, 112, 114. Documents 110, 112, 114 were added to collection 102 by three different users who organize the content of their respective electronic documents differently. The users need not collaborate to ensure that information within documents 110, 112, 114 is in a particular format. Moreover, if one user wishes to change the format of document 110, the user can do so without regard for the format of the documents added by the other users. There is no need for the user to inform the other users of the change. Indeed, in some cases, documents can be added to collection 102 by entities who not only fail to collaborate but who are also competitors who are adverse to one another, such as three different car manufacturers or three different sellers of digital cameras. Regardless of the particular alignment of the entities who add documents to collection 102, no mechanism (e.g., formatting software component or filtering software) is associated with collection 102 that ensures that the information in documents is similarly organized within the documents. Further, no mechanism is associated with collection 102 that ensures that the organization of information in each of each document in collection 102 remains unchanged.

In contrast, structured presentation 106 is structured and presents information drawn from documents in collection 102 in an organized, systematic arrangement. Thus, the grouping, segmentation, and arrangement of information in structured presentation 106 conforms with a structured design even when the information in the presentation is drawn from different contexts in a diverse set of documents in collection 102. Further, changes to any aspect of the design of structured presentation 106 can be propagated throughout structured presentation 106.

Examples of structured presentations include spreadsheet tables, collections of structured cards or other records, and other structured presentation formats. Such structured presentations can also conform with rules that specify the spatial arrangement of information in the displays, the positioning and identification of various organizational and informational aspects (e.g., column headers, row headers, unit identifiers, and the like) of the structured presentations, the graphical representation of values, and other characteristics.

The structuring of information in structured presentations generally facilitates the understanding of the information by a viewer. For example, a viewer can discern the nature of the information contained within the structured presentation by reading headers. A viewer of can easily identify and compare values presented in the structured presentation based on the arrangement and positioning of those values in the display. For example, a user can easily ascertain that certain values in a structured presentation all relate to attributes (i.e., characteristics) of different cars and can easily compare those values.

System 100 is not limited to merely populating structured presentation 106 with values drawn from documents in collection 102. Instead, in many implementations, system 100 can determine entities (i.e., "instances") that are to be described in structured presentation 106, values that characterize the attributes of those instances, as well as an appropriate structuring of structured presentation 106. Such determinations can be based on information drawn from different documents in collection 102 that are not restricted to having a specific format, a permanent format, or both. For example, the attributes that appear in structured presentation 106 can be based on the attributes used in documents in collection 102 to characterize certain instances, as discussed further below. As another example, the units of the values (e.g., meters, feet, inches, miles) that appear in structured presentation 106 can be based on the units of the values that appear in documents in collection 102. As another example, the instances that appear in structured presentation 106 can be determined based on instances that appear in documents in collection 102.

Further, in many implementations, such information can be drawn from previously unspecified documents in collection 102. For example, a search query can be used to identify documents in collection 102 and the information can be drawn from these documents. There need not be preexisting limits on the identity or type of documents from which information can be drawn. For example, the identified documents need not be limited to being associated with the account of a particular individual or originating from a particular retailer. Instead, the information can be drawn from previously unspecified documents.

System 100 can thus exploit the diverse information content of documents in collection 102 in a variety of different ways to present a structured presentation to a user. In cases where electronic document collection 102 includes a large number of documents, the amount of information that can be exploited can be very large. Moreover, in many cases, this can be done automatically or with a relatively small amount of human interaction, as discussed further below.

Figure 2:
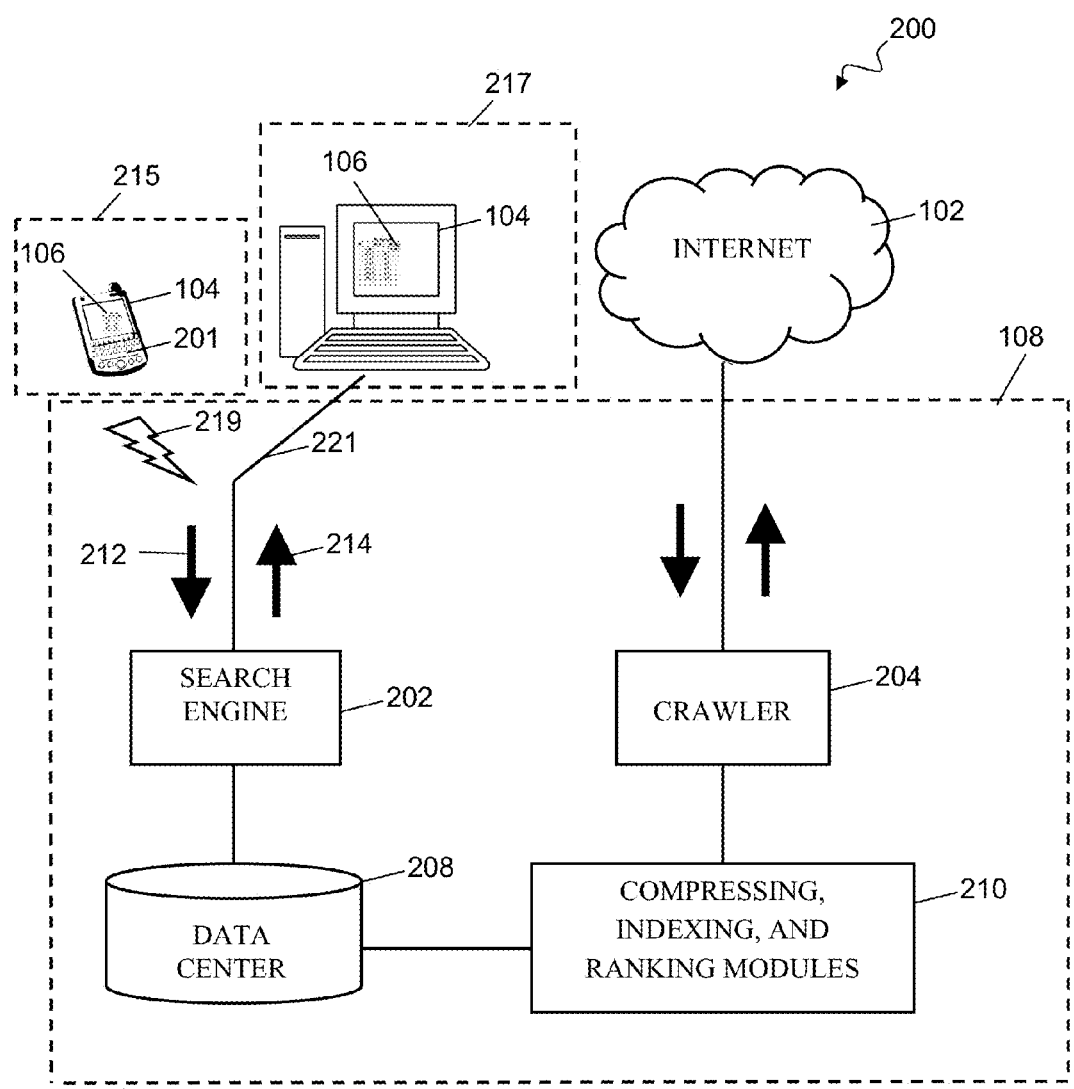
FIG. 2 is a schematic representation of an implementation of another system in which information from an electronic document collection is presented to a user in a structured presentation.

FIG. 2 is a schematic representation of an implementation of a system 200 in which information from an unstructured electronic document collection 102 is presented to a user in a structured presentation 106. In system 200, the data communication infrastructure 108 interconnects electronic document collection 102, display screen 104, and a collection of data storage and processing elements, including a search engine 202, a crawler 204, a data center 208, and document compressing, indexing and ranking modules 210.

Search engine 202 can be implemented on one or more computers deployed at one or more geographical locations that are programmed with one or more sets of machine-readable instructions for searching unstructured electronic document collection 102. Other functionality can be implemented on the one or more computers in addition to the functionality of search engine 202.

Crawler 204 can be implemented on one or more computers deployed at more or more geographical locations that are programmed with one or more sets of machine-readable instructions for crawling unstructured electronic document collection 102. Other functionality can be implemented on the one or more computers in addition to the functionality of crawler 204.

Compressing, indexing, and ranking modules 210 can be implemented on one or more computers deployed at more or more geographical locations that are programmed with one or more sets of machine-readable instructions for compressing, indexing, and ranking documents in collection 102. Other functionality can be implemented on the one or more computers in addition to the functionality of compressing, indexing, and ranking modules 210. The data center 208 stores information characterizing electronic documents in electronic document collection 102. The information characterizing such electronic documents can be stored in the form of an indexed database that includes indexed keywords and the locations of documents in collection 102 where the keywords can be found. The indexed database can be formed, e.g., by crawler 204.

In some implementations, the information stored in data center 208 can itself be organized to facilitate presentation of structured presentation 106 to a user. For example, information can be organized by crawler 204 and compressing, indexing and ranking modules 210 in anticipation of the need to present structured presentations 106 that are relevant to certain topics. The structure of information in data center 208 can facilitate the grouping, segmentation, and arrangement of information in structured presentations 106. This organization can be based on a variety of different factors. For example, an ontology can be used to organize information stored in data center 208. As another example, a historical record of previous structured presentations 106 can be used to organize information stored in data center 208. As another example, the data tables described in this specification can be used to organize information stored in data center 208.

As shown, system 200 includes multiple display screens 104 that can present structured presentations in accordance with machine-readable instructions. Display screens 104 can include, e.g., cathode ray tubes (CRT's), light emitting diode (LED) screens, liquid crystal displays (LCD's), gas-plasma displays, and the like. Display screens 104 can be an integral part of a self-contained data processing system, such as a personal data assistant (PDA) 215, a desktop computer 217, or a mobile telephone. In general, instructions for presenting structured presentations are modified to the particularities of a display screen 104 after receipt by such a self-contained data processing system. However, this is not always the case. For example, dDisplay screens 104 can also be part of more disperse systems where the processing of instructions for presenting a structured presentation is completed before the instructions are received at display screen 104. For example, display screens 104 can be incorporated into "dumb" devices, such as television sets or computer monitors, that receive instructions for presenting structured presentation 106 display instructions from a local or remote source.

In operation, system 200 can transform the unstructured information in collection 102 into structured presentation 106, which can be presented to a viewer. Such transformations can be performed in the context of web search in which a search engine receives and responds to information requests based on information extracted from the electronic documents in collection 102.

For example, personal digital assistant (PDA) 215 or desktop computer 217 can interact with a user and thereby receive a search query, e.g., by way of a web browser application. A description 212 of the query can be transmitted over a wireless data link 219 and/or a wired data link 221 to search engine 202. In response, search engine 202 can use query description 212 to identify information in data center 208 that can be used in presenting structured presentation 106 on display screen 104. The identified information can be drawn from two or more unspecified electronic documents in unstructured electronic document collection 102. In some instances, query description 212 can include search terms that are used by search engine 202 to retrieve information for presenting a structured presentation 106 to a user. For example, search terms in query description 212 can be used to identify, in data center 208, a collection of related instances, attributes that characterize such instances, value that characterize the individual instances, and/or other aspects of structured presentation 106.

The search engine 202 can also generate a response 214 to query description 212. The response 214 can be used to present structured presentation 106 for a user. In general, response 214 includes machine readable-instructions that can be interpreted by a data processing device in systems 215, 217 to present structured presentation 106. For example, response 214 can be coded in HTML to specify the characteristics and content of structured presentation 106. In other implementations, response 214 can include text snippets or other information from data center 208 that is used in presenting structured presentation 106. For example, response 214 can include a collection of values, the name of a new attribute, or an estimate of the likelihood that a value to be displayed in structured presentation 106 is correct, as discussed further below.

In many cases, system 200 uses the information stored in data center 208 to identify the location of one or more documents that are relevant to the query described in query description 212. For example, search engine 202 can compare the keywords in query description 212 to an index of keywords stored in data center 208. The comparison can be used to identify documents in collection 102 that are relevant to query description 212. The locations of such identified documents can be included in responses 214, e.g., as a hyperlink to the documents that are that are responsive to the described query.

In some implementations, the system 200 can store attributes and/or their respective values in a manner that facilitates the grouping, segmentation, and arrangement of information in structured presentations 106. For example, collections of instances, their attributes, and their values can be stored in data center 208 as structured presentations 106 are amended and changed by users interacting with client systems such as systems 215, 217. For example, instances, attributes, and values in one structured presentation 106 presented to a first viewer can be stored in the data center 208 and used in providing subsequent structured presentations 106 to other viewers.

Figure 3:
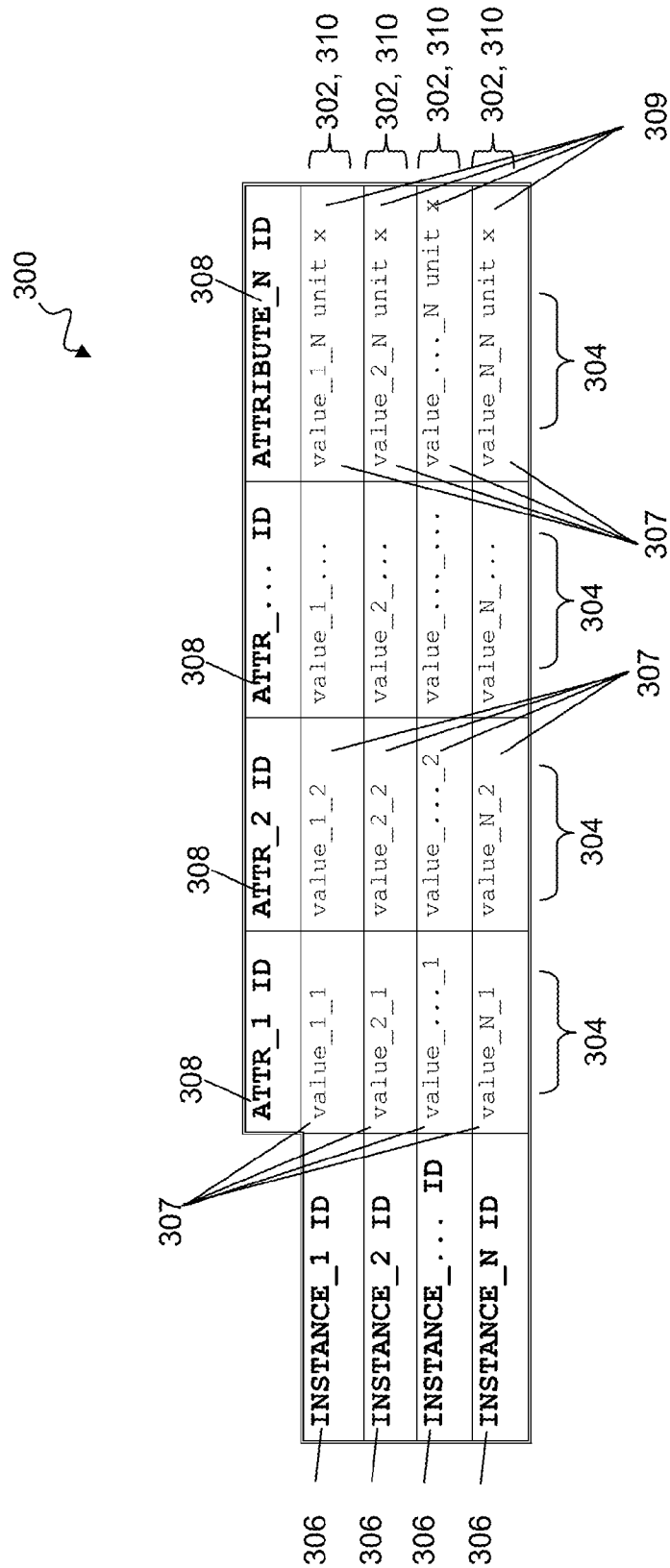
FIGS. 3, 4, and 5 are schematic representations of example structured presentations.

FIG. 3 is a schematic representation of an example structured presentation 106, namely, one that includes a table 300. Table 300 is an organized, systematic arrangement of one or more identifiers of instances, as well as the values of particular attributes of those instances. Instances are individually identifiable entities and generally share at least some common attributes. An attribute is a property, feature, or characteristic of an entity. For example, Tom, Dick, and Harry are instances of individuals. Each such individual has attributes such as a name, a height, a weight, and the like. As another example, city instances each have a geographic location, a mayor, and a population. As yet another example, a product instance can have a model name, a maker, and a year.

The attributes of an instance can be characterized by values. The values of a particular attribute of a particular instance thus characterize that particular instance. For example, the name of an individual can have the value "Tom," the population of a city can have the value "4 million," and the model name of a product can have the value "Wrangler." In some implementations, structured presentations such as table 300 can also include identifiers of attributes, as well as identifiers of the units in which values are expressed.

The grouping, segmentation, and arrangement of information in table 300 can be selected to facilitate understanding of the information by a user. In this regard, table 300 includes a collection of rows 302. Each row 302 includes an instance identifier 306 and a collection of associated attribute values 307. The arrangement and positioning of attribute values 307 and instance identifiers 306 in rows 302 thus graphically represents the associations between them. For example, a user can discern the association between attribute values 307 and the instance identifier 306 that is found in the same row 302.

Table 300 also includes a collection of columns 304. Each column 304 includes an attribute identifier 308 and a collection of associated attribute values 307. The arrangement and positioning of attribute values 307 and attribute identifier 308 in columns 304 thus graphically represent the associations between them. For example, a user can discern the association between attribute values 307 and the attribute identifier 308 that is found in the same column 304 based on their alignment.

Each row 302 is a structured record 310 in that each row 302 associates a single instance identifier 306 with a collection of associated attribute values 307. Further, the arrangement and positioning used to denote these associations in one structured record 310 is reproduced in other structured records 310 (i.e., in other rows 302). Indeed, in many cases, all of the structured records 310 in a structured presentation 106 are restricted to having the same arrangement and positioning of information. For example, values 307 of the attribute "ATTR_2" are restricted to appearing in the same column 304 in all rows 302. As another example, attribute identifiers 308 all bear the same spatial relationship to the values 307 appearing in the same column 304. Moreover, changes to the arrangement and positioning of information in one structured record 310 are generally propagated to other structured record 310 in the structured presentation 106. For example, if a new attribute value 307 that characterizes a new attribute (e.g., "ATTR_2¾") is added to one structured record 310, then a new column 304 is added to structured presentation 106 so that the values of attribute "ATTR_2¾" of all instances can be added to structured presentation 106.

In some implementations, values 307 in table 300 can be presented in certain units of measure. Examples of units of measure include feet, yards, inches, miles, seconds, gallons, liters, degrees Celsius, and the like. In some instances, the units of measure in which values 307 are presented are indicated by unit identifiers 309. Unit identifiers 309 can appear, e.g., beside values 307 and/or beside relevant attribute identifiers 308. The association between unit identifiers 309 and the values 307 whose units of measure are indicated is indicated to a viewer by such positioning. In many cases, all of the values 307 associated with a single attribute (e.g., all of the values 307 in a single column 304) are restricted to being presented in the same unit of measure.

The information extracted from electronic document collection 102 by systems 100, 200 can impact the presentation of table 300 to a user in a variety of different ways. For example, the information extracted from electronic document collection 102 can be used to determine values 307 for populating table 300. As another example, the information extracted from electronic document collection 102 can be used to suggest new attributes and/or new instances for addition to table 300.

In some implementations, instance identifiers 306 can be selected based on one or more search strings. For example, if the search string "hybrid vehicles" is received from a user by search engine 202, systems such as system 200 can generate and populate table 300 based on information extracted from electronic document collection 102 using the search string. For example, system 200 can access data center 208, identify instance identifiers 306 in the electronic documents that are relevant to the search string, determine a set of common attributes for the identified instances—as well as identifiers 308 of those attributes and values 307 for those attributes. In effect, system 200 can determine instance identifiers 306, attribute identifiers 308, as well as the associated values 307 based on the received search string.

In some implementations, one or more attribute identifiers 308, instance identifiers 306, and/or values 307 can be received from a user for whom table 300 is to be displayed. As discussed further below, systems such as system 200 can generate and populate table 300 based on information extracted from electronic document collection 102 using one or more received attribute identifiers 308, instance identifiers 306, and/or values 307. In effect, system 200 can formulate new instance identifiers 306, attribute identifiers 308, as well as the associated values 307 based on the received attribute identifiers 308, instance identifiers 306, and/or values 307.

Figure 4:
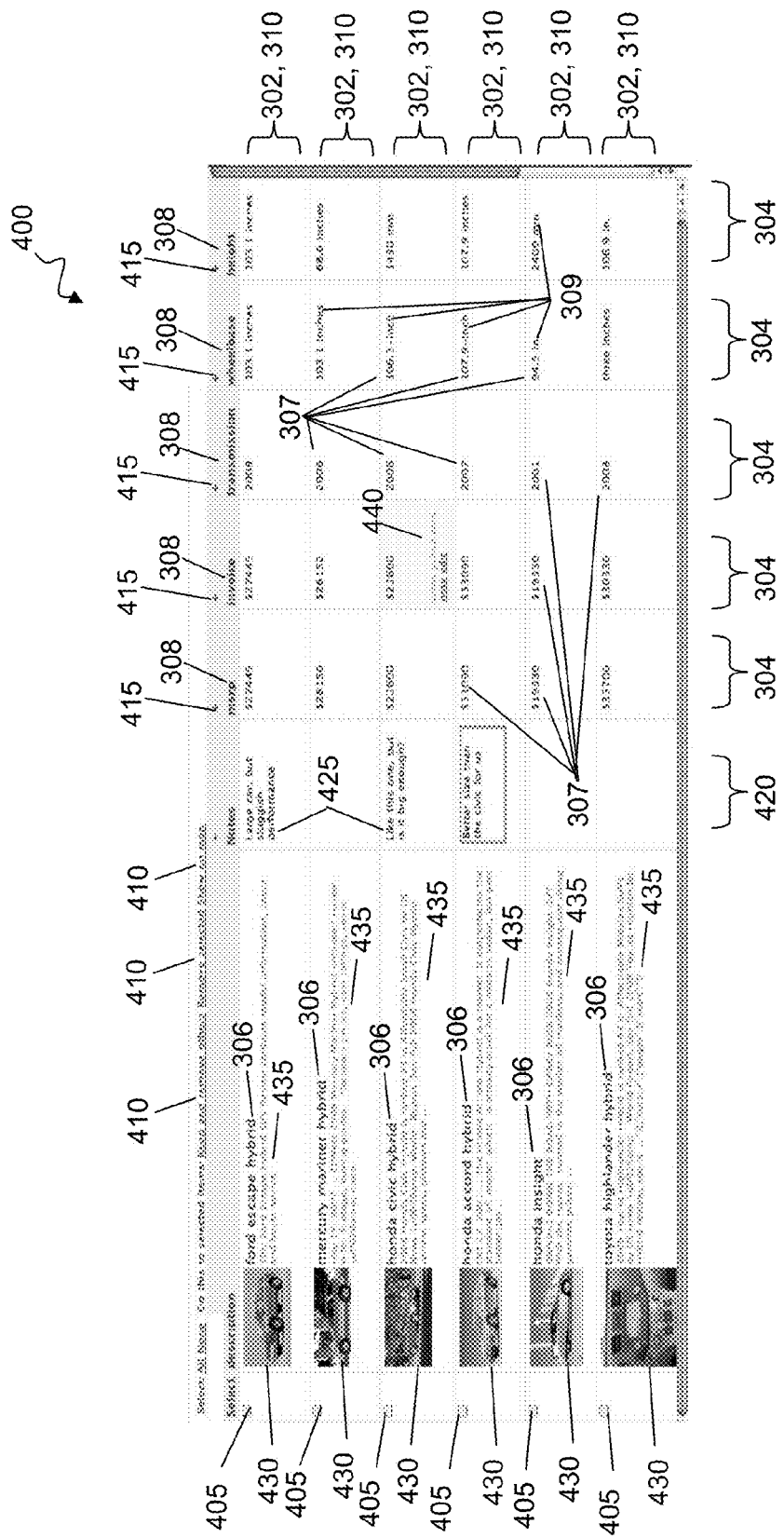

FIG. 4 is a schematic representation of another implementation of a structured presentation, namely, one that includes a table 400. In addition to including attribute identifiers 308, instance identifiers 306, values 307, unit identifiers 309 organized into rows 302 and columns 304, table 400 also includes a number of interactive elements for interacting with a user. In particular, table 400 includes a collection of instance selection widgets 405, a collection of action triggers 410, a collection of column action trigger widgets 415, and a notes column 420.

Instance selection widgets 405 are user interface components that allow a user to select structured records 310 in table 400. For example, instance selection widgets 405 can be a collection of one or more clickable checkboxes that are associated with a particular structured record 310 by virtue of arrangement and positioning relative to that structured record 310. Instance selection widgets 405 are "clickable" in that a user can interact with widgets 405 using a mouse (e.g., hovering over the component and clicking a particular mouse button), a stylus (e.g., pressing a user interface component displayed on a touch screen with the stylus), a keyboard, or other input device to invoke the functionality provided by that component.

Action triggers 410 are user interface components that allow a user to trigger the performance of an action on one or more structured records 310 in table 400 selected using instance selection widgets 405. For example, action triggers 410 can be clickable text phrases, each of which can be used by a user to trigger an action described in the phrase. For example, a "keep and remove others" action trigger 410 triggers the removal of structured records 310 that are not selected using instance selection widgets 405 from the display of table 400. As another example, a "remove selected" action trigger 410 triggers the removal of structured records 310 that are selected using instance selection widgets 405 from the display of table 400. As yet another example, a "show on map" action trigger 410 triggers display of the position of structured records 310 that are selected using instance selection widgets 405 on a geographic map. For example, if a selected instance is a car, locations of car dealerships that sell the selected car can be displayed on a map. As another example, if the selected instances are vacation destinations, these destinations can be displayed on a map.

Column action trigger widgets 415 are user interface components that allow a user to apply an action to all of the cells within a single column 304. When a user interacts with the clickable '+' sign, a further user interface component is displayed which offers to the user a set of possible actions to be performed. The actions in this set can include, e.g., removing the entire column 304 from the structured presentation 400 or searching to find values for all the cells in column 304 which are currently blank.

Notes column 420 is a user interface component that allows a user to associate information with an instance identifier 306. In particular, notes column 420 includes one or more notes 425 that are each associated with a structured record 310 by virtue of arrangement and positioning relative to that structured record 310. The information content of notes 425 is unrestricted in that, unlike columns 304, notes 425 are not required to be values of any particular attribute. Instead, the information in notes 425 can characterize unrelated aspects of the instance identified in structured record 310.

In some implementations, table 400 can include additional information other than values of any particular attribute. For example, table 400 can include a collection of images 430 that are associated with the instance identified in a structured record 310 by virtue of arrangement and positioning relative to that structured record 310. As another example, table 400 can include a collection of text snippets 435 extracted from electronic documents in collection 102. The sources of the snippets can be highly ranked results in searches conducted using instance identifiers 306 as a search string. Text snippets 435 are associated with the instance identified in a structured record 310 by virtue of arrangement and positioning relative to that structured record 310.

As another example, table 400 can include one or more hypertext links 440 to individual electronic documents in collection 102. For example, the linked documents can be highly ranked results in searches conducted using instance identifiers 306 as a search string. As another example, the linked documents can be source of a value 307 that was extracted to populate table 400. In some instances, interaction with hypertext link 440 can trigger navigation to the source electronic document based on information embedded in hypertext link 440 (e.g., a web site address).

Figure 5:
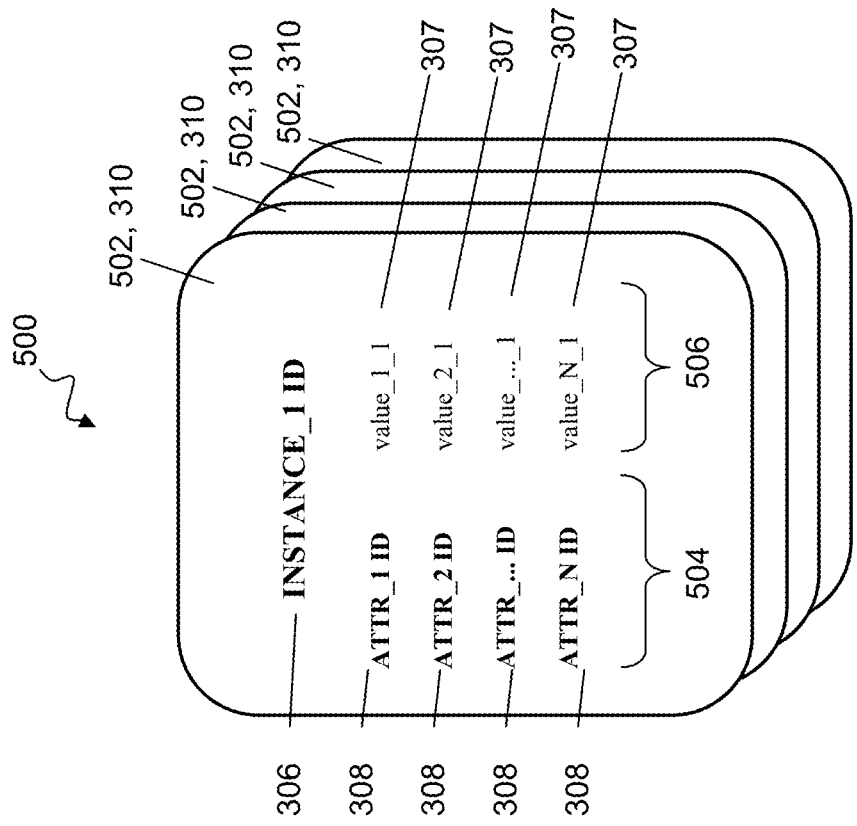

FIG. 5 is a schematic representation of another implementation of a structured presentation, namely, a collection of cards 500. Card collection 500 is an organized, systematic arrangement of one or more identifiers of instances, as well as the values of particular attributes of those instances. The attributes of an instance can be specified by values. Moreover, card collection 500 generally includes identifiers of attributes, as well as identifiers of the units in which values are expressed, where appropriate.

The grouping, segmentation, and arrangement of information in card collection 500 can be selected to facilitate an understanding of the information by a user. In this regard, card collection 500 includes a collection of cards 502. Each card 502 includes an instance identifier 306 and a collection of associated attribute values 307. The arrangement and positioning of attribute values 307 and instance identifiers 306 in cards 502 thus graphically represents the associations between them. For example, a user can discern the association between attribute values 307 and the instance identifier 306 that is found on the same card 502.

In the illustrated implementation, cards 502 in card collection 500 also include a collection of attribute identifiers 308. Attribute identifiers 308 are organized in a column 504 and attribute values 307 are organized in a column 506. Columns 504, 506 are positioned adjacent one another and aligned so that individual attribute identifiers 308 are positioned next to the attribute value 307 that characterizes that identified attribute. This positioning and arrangement allows a viewer to discern the association between attribute identifiers 308 and the attribute values 307 that characterize those attributes.

Each card 502 is a structured record 310 in that each card 502 associates a single instance identifier 306 with a collection of associated attribute values 307. Further, the arrangement and positioning used to denote these associations in one card 502 is reproduced in other cards 502. Indeed, in many cases, all of the cards 502 are restricted to having the same arrangement and positioning of information. For example, the value 307 that characterizes the attribute "ATTR_1" is restricted to bearing the same spatial relationship to instance identifiers 306 in all cards 502. As another example, the order and positioning of attribute identifiers 308 in all of the cards 502 is the same.

Moreover, changes to the arrangement and positioning of information in one card 502 are generally propagated to other cards 502 in card collection 500. For example, if a new attribute value 307 that characterizes a new attribute (e.g., "ATTR_1¾") is inserted between the attribute values "value_1_1" and "value_2_1" in one card 502, then the positioning of the corresponding attribute values 307 in other cards 502 is likewise changed.

In some implementations, cards 502 in card collection 500 can include other features. For example, cards 502 can include interactive elements for interacting with a user, such as instance selection widgets, action triggers, attribute selection widgets, a notes entry, and the like. As another example, cards 502 in card collection 500 can include additional information other than values of any particular attribute, such as images and/or text snippets that are associated with an identified instance. As another example, cards 502 in card collection 500 can include one or more hypertext links to individual electronic documents in collection 102. Such features can be associated with particular instances by virtue of appearing on a card 502 that includes an instance identifier 306 that identifies that instance.

During operation, a viewer can interact with the system presenting card collection 500 to change the display of one or more cards 502. For example, a viewer can trigger the side-by-side display of two or more of the cards 502 so that a comparison of the particular instances identified on those cards is facilitated. As another example, a viewer can trigger a reordering of card 502, an end to the display of a particular card 502, or the like. As another example, a viewer can trigger the selection, change, addition, and/or deletion of attributes and/or instances displayed in cards 502. As yet another example, a viewer can trigger a sorting of cards into multiple piles according to, e.g., the values of an attribute values 307 in the cards.

In some implementations, cards 502 will be displayed with two "sides." For example, a first side can include a graphic representation of the instance identified by instance identifier 306, while a second side can include instance identifier 306 and values 307. This can be useful, for example, if the user is searching for a particular card in the collection of cards 500, allowing the user to identify the particular card with a cursory review of the graphical representations on the first side of the cards 502.

Figure 6:
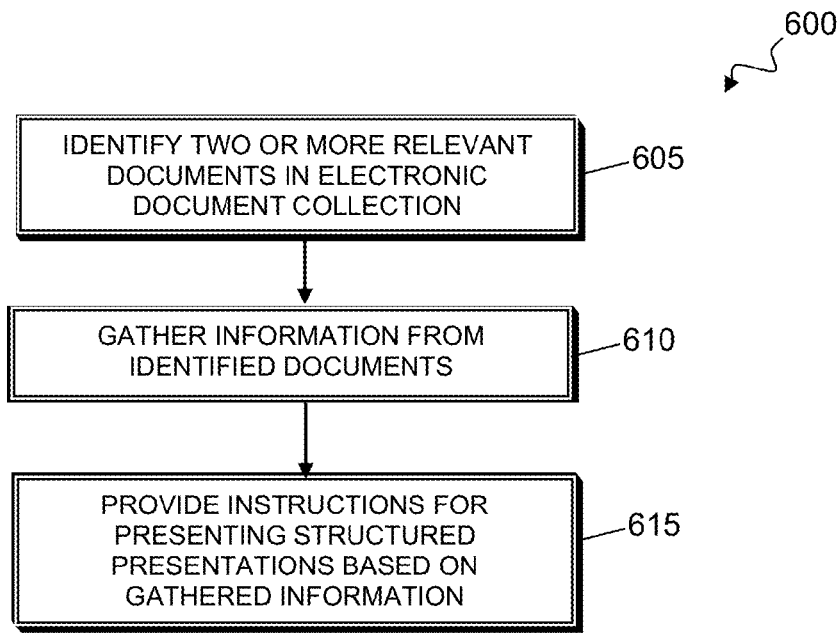
FIG. 6 is a flow chart of an example process for presenting information from an electronic document collection to a user in a structured presentation.

FIG. 6 is a flow chart of a process 600 for presenting information from an electronic document collection to a user in a structured presentation. Process 600 can be performed by one or more computers that perform operations by executing one or more sets of machine-readable instructions. For example, process 600 can be performed by the search engine 202 in system 200. In some implementations, process 600 can be performed in response to the receipt of a trigger, such as a user request to create or change a structured presentation.

The system performing process 600 can identify two or more responsive electronic documents in the electronic document collection (step 605). The responsive documents can be identified in a number of different ways. In some instances, documents are identified based on "new" information—such as, e.g., a new search query—received from viewer. For example, the system can compare a newly received search query with the content of the electronic documents in the electronic document collection using string comparisons. As another example, the system can access a data center such as data center 208 and compare the terms in a search query with an index of keywords to identify the location of responsive electronic documents.

In some instances, documents are identified based on "old" information that is already found in a structured presentation. Among the information found in a structured presentation are the identities of instances, attributes, values, and the units in which the values are represented. The system performing process 600 can use this old information to identify responsive electronic documents in the electronic document collection. For example, documents that include instances already found in a structured presentation can be identified as responsive. As another example, documents that characterize instances using attributes already found in a structured presentation can be identified as responsive. Additional examples of such identifications are discussed further below.

The system performing process 600 can also gather information from the identified electronic documents (step 610). The gathered information can regard one or more instances, attributes, and/or values. The system performing process 600 can gather this information directly from the documents in an electronic document collection or from previously assembled collections of information that characterize the electronic documents in an electronic document collection. For example, in the context of system 200 (FIG. 2), the system performing process 600 can locate documents in collection 102, access the located documents, and extract the information directly from the original documents in collection 102. As another example in the context of system 200 (FIG. 2), the system performing process 600 can access a collection of information in data center 208 and gather the information from, e.g., a database that includes an index of keywords and the location of documents that include those keywords, an ontology, and/or a historical record of previous structured presentations that were presented using information extracted from documents in collection 102.

The system performing process 600 can use the gathered information to provide instructions for presenting structured presentations based on the gathered information (step 615). For example, the system performing process 600 can generate machine-readable instructions for presenting a structured presentation such as tables 300, 400 or collection of cards 500.

Figure 7:
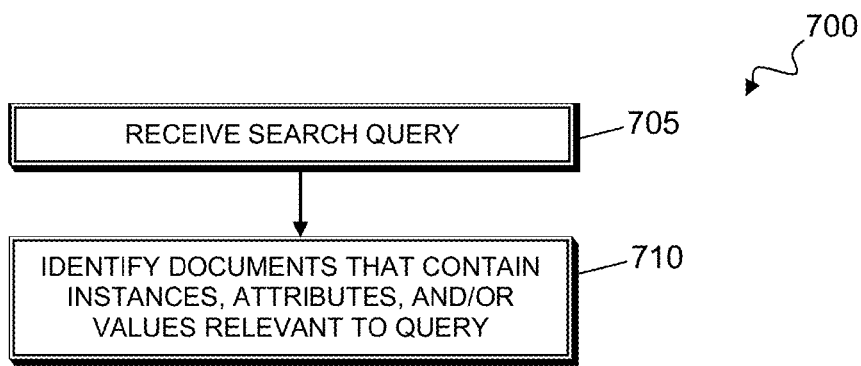
FIGS. 7 and 8 are flow charts of example processes for identifying two or more relevant documents in an electronic document collection.

FIG. 7 is a flow chart of a process 700 for identifying responsive documents in an electronic document collection. Process 700 can be performed in isolation or in conjunction with other data processing activities. For example, process 700 can be performed in conjunction with identifying two or more responsive electronic documents in the electronic document collection (step 605) in process 600 (FIG. 6).

The system performing process 700 receives a search query (step 705). For example, the system can receive one or more search strings (e.g., "hybrid vehicles") from a user. As another example, the system can receive a search string from another process or system. In some implementations, the search string is received through an application programming interface (API), a common gateway interface (CGI) script, or other programming interfaces. In other implementations, the search string is received through a web portal, a web page, or web site, or the like.

In response, the system performing process 700 identifies two or more documents that contain instances, attributes, and/or values that are responsive to the search query (step 710). The documents can be identified by classifying the role that terms in the search query are to play in a structured presentation. For example, the terms in a search query can be classified as a categorization of the instances that are to appear in a structured presentation based on, e.g., the particular terms in the search query, an express indication by the user as to how search query terms are to be classified, and/or the context of the search. By way of example, the terms in a search query "cities in California" can be classified as a categorization of instances such as "San Diego," "Los Angeles," and "Bakersfield" due to the plural term "cities" being characterized by an attribute, namely, being "in California." As another example, the terms in a search query "Ivy League schools" can be classified as categorization of instances (such as "Cornell," "Columbia," and "Brown") due to the plural term "schools" being characterized by an attribute "Ivy League."

In some cases, additional information must be used to classify the terms in a search query. For example, the search query "Ivy League" can reasonably be taken as a categorization of school instances or as an example instance of the category "athletic conferences" which includes instances such as "Atlantic Coast Conference" and "PAC-10." In such cases, the terms can be classified, e.g., based on an express indication by the user as to how they are to be classified or based on the context of the terms in a search session. For example, if a user had previously entered the phrases "Atlantic Coast Conference" and "PAC-10" as search queries, the search query "Ivy League" can be taken as an example instance that is to appear in a structured presentation alongside those other instances.

The documents can be identified either directly in electronic document collection 102 or indirectly based on information in electronic data center 208. Such identifying information can include, e.g., the URL where the document was found the last time it was crawled.

Figure 8:
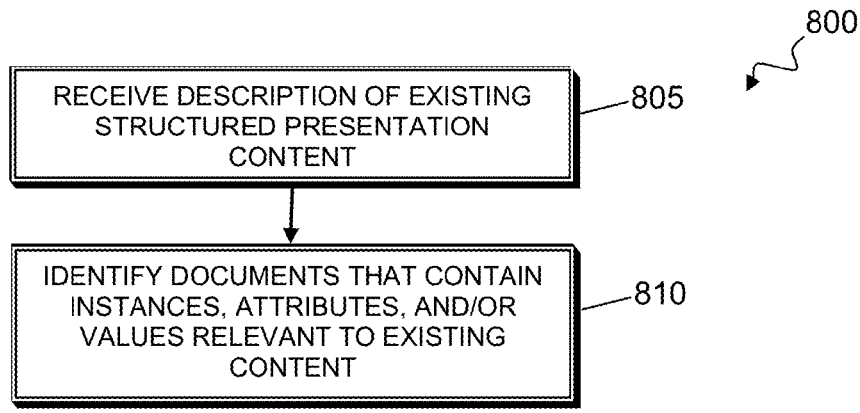

FIG. 8 is a flow chart of another example process 800 for identifying two or more responsive documents in an electronic document collection. Process 800 can be performed in isolation or in conjunction with other data processing activities. For example, process 800 can be performed in conjunction with identifying two or more responsive electronic documents in the electronic document collection (step 605) in process 600 (FIG. 6). As another example, process 800 can be performed in conjunction with process 700 for identifying responsive documents in an electronic document collection at step 605 in process 600 (FIG. 6). For example, processes 700, 800 can be part of an iterative, interactive process in which a search query is received and used to identify a first collection of responsive documents, a first structured presentation that includes content drawn from the identified documents is presented to a user, user modifications are received, and a description of the modified structured presentation is used to identify a second collection of relevant documents. In some implementations, process 800 can be performed several times. In some implementations, process 800 can be performed without user input, e.g., by crawler 206 in system 200 (FIG. 2).

The system performing process 800 receives a description of existing content of a structured presentation (step 805). In particular, the system can receive a description of the instances, the attributes, the values, and/or the units in which values are presented in an existing structured presentation. The description can include, e.g., identifiers of the instances and the attributes and/or ranges of the values of the attributes. The description can also include a categorization of the instances and/or attributes. Such a categorization can be determined, e.g., using an ontology or based on a categorization assigned by a viewer to a structured presentation. For example, if a user entitles a structured presentation "Ivy League Schools," then this title can be taken as a categorization of the instances in that structured presentation.

In response, the system performing process 800 can identify one or more documents that contain instances, attributes, and/or values that are relevant to the existing content (step 810). For example, the system can compare the identifiers of instances and/or attributes to indexed keywords to determine if particular documents contain one or more of the instances and/or attributes that already appear in the existing content of a structured presentation. As another example, the system can identify new instances, their attributes, and the values of such attributes from such documents, compare these values to values that already appear in the existing content of a structured presentation, and determine whether the new instances are potentially relevant to the to the existing content of the structured presentation.

The documents can be identified either directly in electronic document collection 102 or using identifying information in electronic data center 208. Such identifying information can include, e.g., the memory location where the document was found the last time it was crawled.

Figure 9:
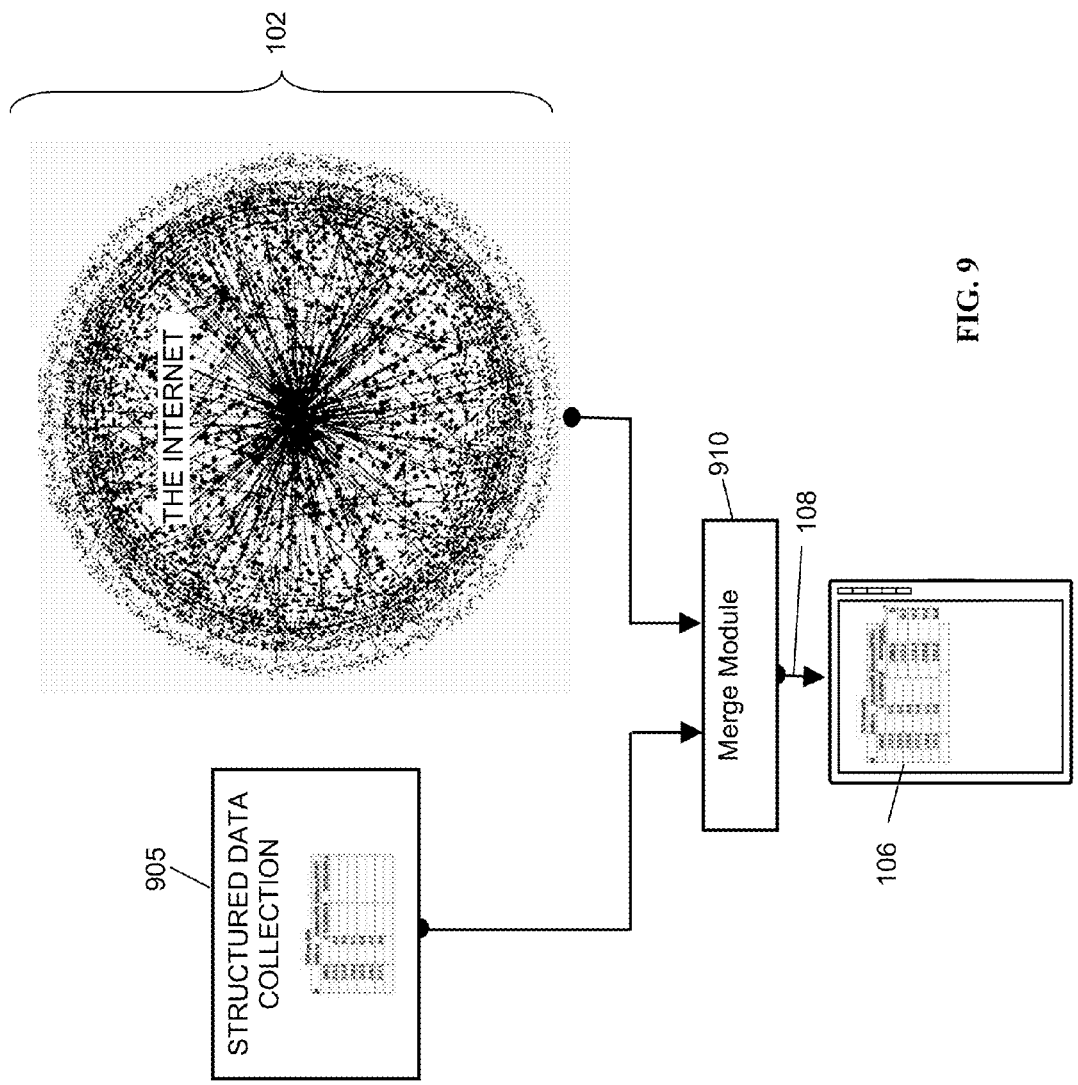
FIG. 9 is a schematic representation of a system in which attribute values drawn from two or more electronic documents in electronic document collection are presented to a user in a structured presentation.

FIG. 9 is a schematic representation of a system 900 in which attribute values 307 drawn from two or more electronic documents in electronic document collection are presented to a user in a structured presentation. In addition to electronic document collection 102, display screen 104, and data communication path 108, system 900 includes a structured data 905 and a merge module 910. In operation, system 900 extracts attribute values from an unstructured collection of electronic documents in electronic document collection 102 and merges that information with information drawn from structured data 905 to populate structured presentation 106.

System 900 can populate all or only a fraction of structured presentation 106 with attribute values. There are many circumstances in which only a fraction of a structured presentation may be populated with attribute values. For example, the population may be part of the addition of new instances (and hence new structured records) to structured presentation 106. As another example, the population may be part of the addition of new attributes to structured presentation 106. As yet another example, the population may be part of the refinement of a fraction of the existing attribute values in structured presentation 106. For example, some fraction of the original attribute values can be checked for accuracy or to ensure that the characterized instances haven't changed.

Structured data 905 is a structured collection of information. The information in structured data 905 can be organized in accordance with a defined data model. For example, structured data 905 can be organized in accordance with a hierarchical or a relational data model and stored in a data storage device. In some instances, all or a portion of structured data 905 can be presented to a user in a structured presentation. For example, in some implementations, structured data 905 can be a pre-existing structured presentation 106 that is presented to a user on the same display screen 104 on which the structured presentation 106 that is populated with new attribute values drawn collection 102 is to be presented.

Merge module 910 is a collection of one or more sets of machine-readable instructions deployed on one or more data processing devices. Merge module 910 can include functionality for identifying new attribute values as well as their disposition within the structured presentation 106 that is to be populated therewith. The operations performed by merge module 910 are described in further detail below.

Figure 10:
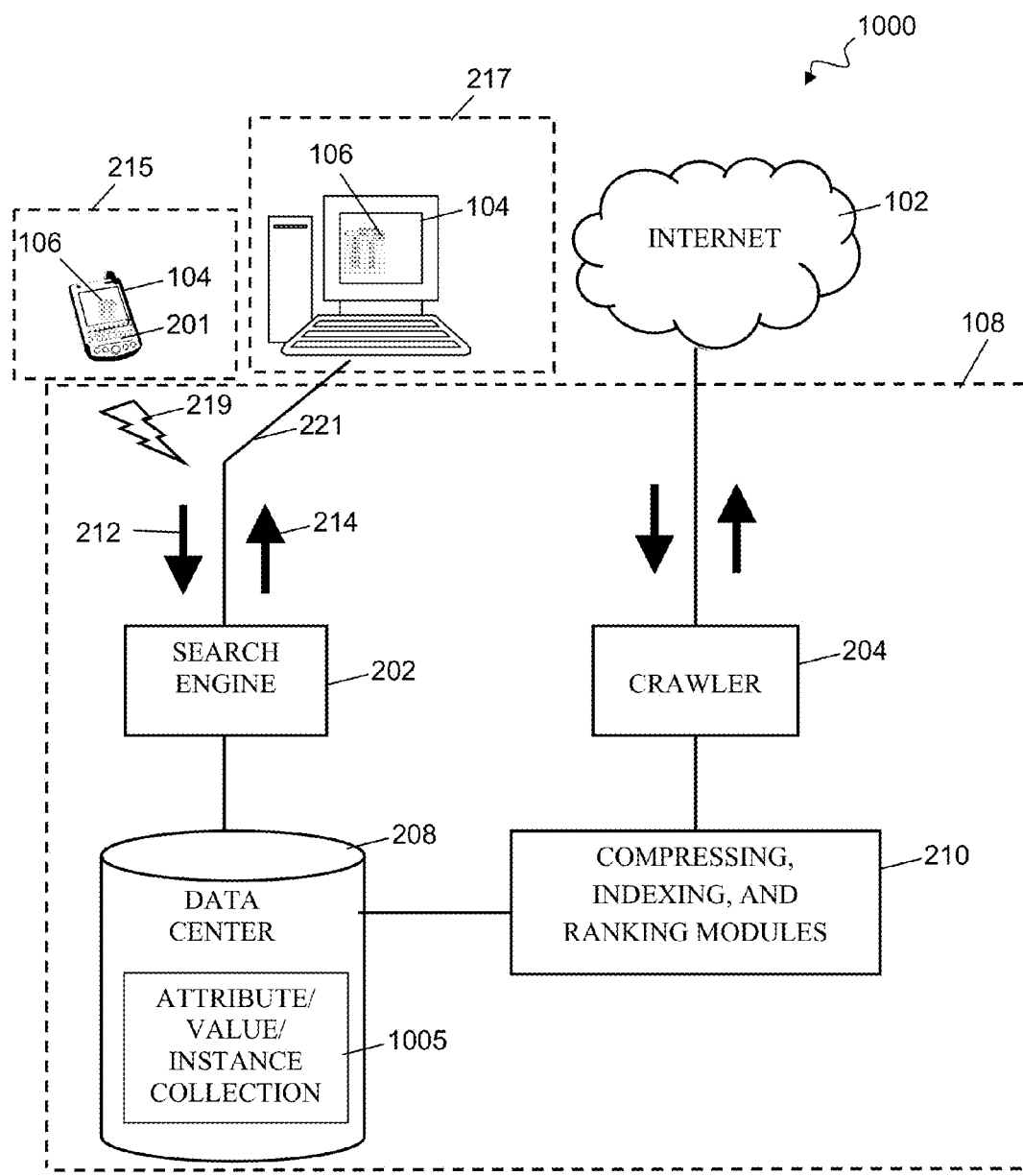
FIG. 10 is a schematic representation of an implementation of system in which attribute values drawn from two or more electronic documents in electronic document collection are presented to a user in a structured presentation.

FIG. 10 is a schematic representation of an implementation of system 1000 in which attribute values drawn from two or more electronic documents in electronic document collection 102 are presented to a user in a structured presentation. In addition to electronic document collection 102, display screen 104, data communication path 108, search engine 202, crawler 204, and compressing, indexing and ranking modules 210, system 1000 also includes an attribute/value/instance collection 1005 at data center 208.

Attribute/value/instance collection 1005 is a collection of information that associates instances with their attributes, as well as the values of those attributes. The information in collection 1005 can be extracted from electronic documents in collection 1002 either in response to receipt of a trigger (such as a search query) or in anticipation of receipt of a trigger, e.g., as part of a process of indexing electronic document collection 102.

Figures 11, 12:
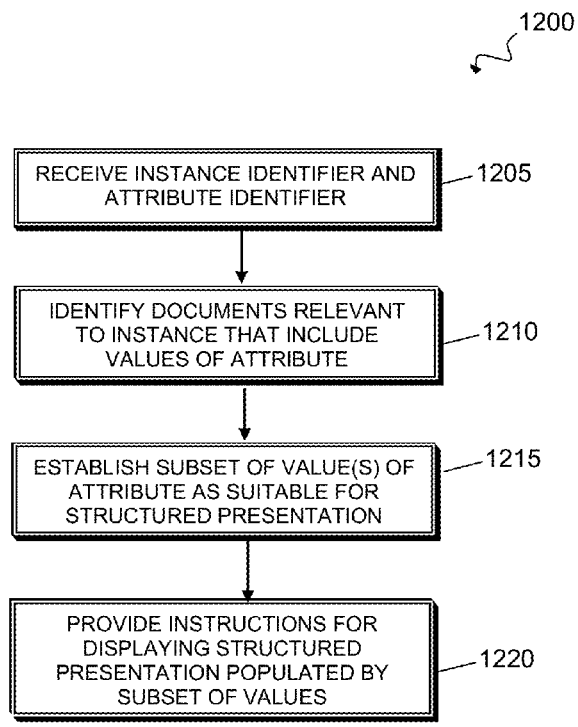
FIG. 11 is a schematic representation of a table that can associate attributes, values, and instances in an electronic document collection.
FIG. 12 is a flow chart of an example process for presenting attribute values drawn from two or more electronic documents in an electronic document collection to a user in a structured presentation.

The association between instances, attributes, and their values can be established in collection 1005 by structuring the information storage within collection 1005. For example, FIG. 11 is a schematic representation of a table 1100 that can associate attributes, values, and instances in collection 1005 (FIG. 10). Table 1100 includes a collection of records 1102, 1104, 1106, 1008, 1110, each of which associates an identifier of an instance with descriptions of a document location and the attributes and values that characterize the identified instances. The information in records 1102, 1104, 1106, 1008, 1110 can be organized in a collection of columns 1115, 1120, 1250, 1130, 1135, 1140, 1145, 1150. In particular, column 1115 can include instance identifiers. Column 1120 can include a description of the location of an electronic document that includes the instance identified in column 1115. Columns 1125, 1135, 1145 can include descriptions of attributes that both characterize the instances identified in column 1115 and that are themselves characterized by a value in the document whose location is described in column 1120. Columns 1130, 1140, 1150 can include descriptions of the values that characterize the attributes described in columns 1125, 1135, 1145 of the instances identified in column 1115 in the documents whose location is described in column 1120.

As shown, different electronic documents can include different categories and amounts of information characterizing the same instance. For example, the document whose location is identified in column 1120 of record 1104 includes information characterizing three attributes of an instance "INSTANCE_1," whereas the document whose location is identified in column 1120 of record 1106 includes information characterizing two attributes of an instance "INSTANCE_1." Moreover, the attributes characterized in record 1104 (i.e., attribute "ATTR_5," attribute "ATTR_6," attribute "ATTR_7") differ from the attributes characterized in record 1106 (i.e., attribute "ATTR_3," attribute "ATTR_4."

Further, the values used to characterize even the same attribute of the same entity can differ in different electronic documents. For example, the document whose location is identified in column 1120 of record 1102 includes a value "VALUE_3A" characterizing the attribute "ATTR_3" of instance "INSTANCE_1," whereas the document whose location is identified in column 1120 of record 1106 includes a value "VALUE_3B" characterizing the same attribute "ATTR_3" of the same instance "INSTANCE_1."

There are a number of different potential sources of such discrepancies between the values that characterize the same attribute of the same entity in different documents. For example, a document can include false information that mischaracterizes the attributes of an entity. In addition to inadvertent errors, the values of an attribute may change over time. Examples of this include, e.g., the value of the "height" attribute of a high school basketball player instance, the value of a "list price" attribute of a house instance, or the value of the "mayor" attribute of a city instance. Some documents may be updated with the correct value whereas other documents may retain the original—but now incorrect—value.

Moreover, even completely accurate documents can characterize the same attribute of the same entity in different ways. For example, different documents can use different units to express the same value. As another example, different documents can express the same value with different precision (e.g., "about a two hour drive to Phoenix" versus "a 130 minute drive to Phoenix at the posted speed limits").

Such discrepancies are especially endemic in the context of an unstructured electronic document collection, such as document collection 102. In this regard, as discussed above, different documents can be added to collection 102 by different users who present information differently. The users who add the documents do not collaborate to ensure that information is presented in a consistent manner, nor is there a formal mechanism for ensuring that the presentation of information in different documents remains unchanged.

Data collections 1005 that associate attributes, values, and instances (e.g., table 1100) can be formed in a number of different ways. For example, documents that include internal, structured components can be identified. Examples of such internal, structured components include tables and lists that appear in HTML documents, and the like. The relationships between attributes, values, and instances in these internal structured components can be copied to form data collections 1005.

As another example, once a first document has been identified as including attributes, values, and/or instances, the template of that document can be used to extract attributes, values, and instances from other documents that include the same template. For example, if a stereo retailer uses the same document template to describe different stereos that are offered for sale, the arrangement of information in a first electronic document regarding a first stereo can be used to extract information from other electronic documents that regard other stereos.

As still another example, the template of a single document can be used to extract attributes, values, and/or instances from that document. For example, the template can specify an arrangement of several attribute and values that characterize those attributes relative to an identifier of an instance. If some of those attributes and/or values are known, then the arrangement of those known attributes and/or values can be identified and used to identify other attributes and/or values.

For example, the template of a single webpage may specify the arrangement of the attribute/value pairs "Director: Orson Welles," "Writer: Orson Welles, Herman J. Mankiewicz," and "Release Date: May 1, 1941" relative to an identifier of the movie instance "Citizen Kane." If the attributes and values "Director: Orson Welles" and "Release Date: May 1, 1941" were already known, the arrangement of those attributes and values relative to the movie instance identifier "Citizen Kane" can be used to extrapolate the attribute/value pair "Writer: Orson Welles, Herman J. Mankiewicz."

In some implementations, techniques such as natural language parsing can be used to identify instances, attributes, and their values. For example, electronic documents can be parsed to identify phrases such as "[Instance] has a/an [attribute] of [value]" in electronic documents.

FIG. 12 is a flow chart of an example process 1200 for presenting attribute values drawn from two or more electronic documents in an electronic document collection to a user in a structured presentation. Process 1200 can be performed by one or more computers that perform operations by executing one or more sets of machine-readable instructions. Process 1200 can be performed in isolation or in conjunction with other data processing activities. For example, process 1200 can be performed as part of process 600 (FIG. 6).

The system performing process 1200 can receive an instance identifier and an attribute identifier (step 1205). The system performing process 1200 can receive the instance identifier and the attribute identifier directly from a user (e.g., in the form of a search query) or indirectly (e.g., as part of a structured data collection 905 (FIG. 9)).

The system performing process 1200 can identify electronic documents relevant to the received instance that include values of the attribute (step 1210). For example, the system can access an attribute/value/instance collection 1105 in a data center 208 (FIG. 10) to identify the relevant electronic documents. As another example, a search engine (such as search engine 202) can perform keyword searches using the instance and attribute identifier to identify relevant documents. In some cases, such keyword searches can be supplemented with language parsing or other techniques that facilitate the identification of values.

The system performing process 1200 can establish a subset of the values for the identified attribute of the identified instance for presentation in a structured presentation (step 1215). The subset of the values can include one or more values that are thought to be appropriate, or likely to be appropriate, for populating the structured presentation. In particular, the subset of the values(s) can be considered to characterize the identified attribute of identified instance both accurately and consistently with the desires of the viewer of the structured presentation. As discussed further below, the desires of the viewer of the structured presentation can be ascertained, e.g., based on a selection of a value received from the viewer or based on the characterization of the same or other attributes of the same or other instances in a preexisting structured collection of information such as, e.g., structured data 905 (FIG. 9).

The system performing process 1200 can provide instructions for displaying structured presentation populated by the subset of values (step 1120). Thus, a structured presentation can be presented based on information gathered from a collection of electronic documents (i.e., the subset of values gathered from an electronic document collection) (step 615, FIG. 6).

In some implementations, process 1200 can be performed a number of times, e.g., for a number of instance identifiers and/or attribute identifiers.

Figure 13:
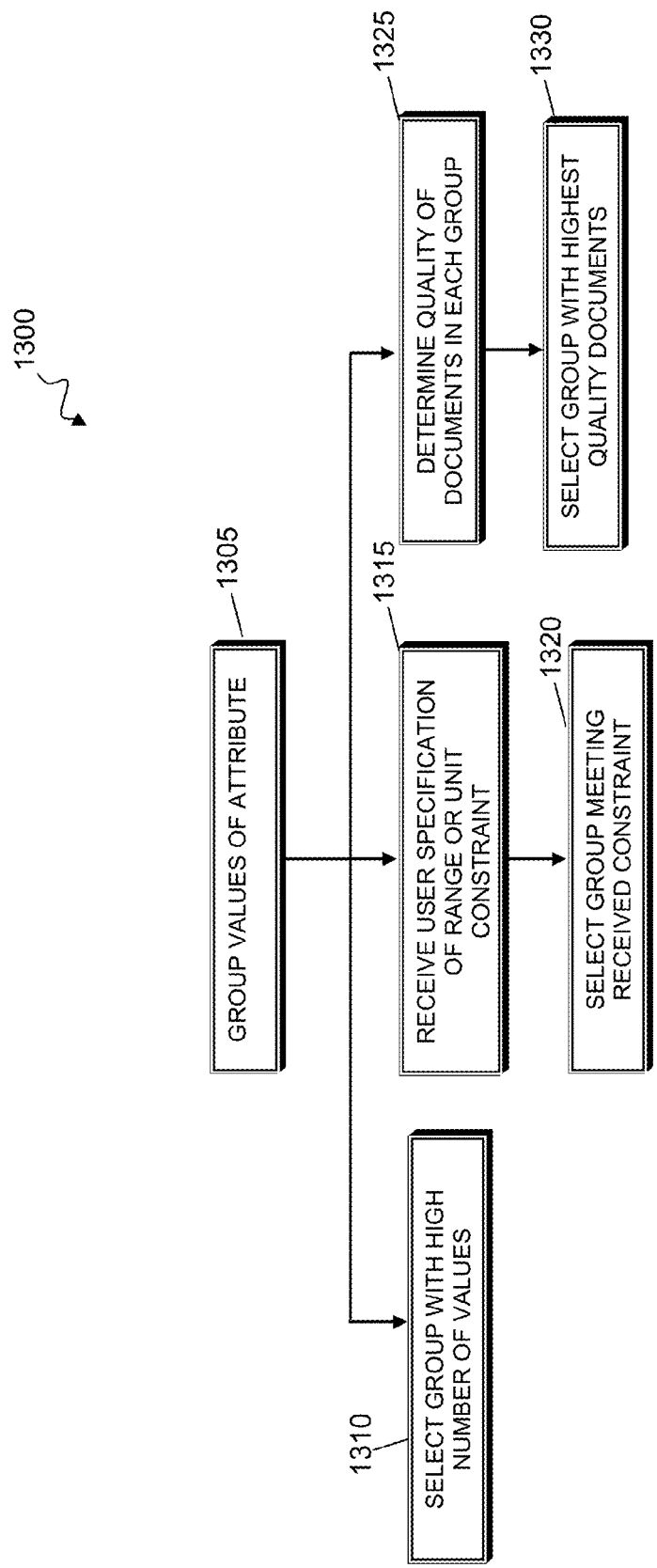
FIG. 13 is a flow chart of a process for selecting one or more values for presentation in a structured presentation.

FIG. 13 is a flow chart of a process 1300 for establishing one or more values for presentation in a structured presentation. Process 1300 can be performed in isolation or in conjunction with other activities. For example, process 1300 can be performed at step 1215 in process 1200.

The system performing process 1300 can group values of an attribute from two or more documents in an electronic document collection into two or more groups (step 1305). The grouped values can be drawn directly from the electronic documents or drawn from a description of the content of the electronic documents, such as an association of attributes, values, and instances like table 1100 (FIG. 11).

The system can group values using one or more different standards for determining when values are to be grouped. For example, one standard can require that grouped values be identical. For example, two values "4" can be grouped. Another standard can require that numerical values be within a certain range of being identical. For example, the values "3.14" and "3.14159" can be grouped. Another standard can require that term values be identical or have an identical meaning. For example, the terms "czar," "czar," and "tsar" can all be grouped. Another standard can require that term values express the same concept in an ontology of concepts. For example, the terms "pink" and "mauve" can be grouped. Another standard allows values written in different formats to be grouped. For example, the dates "Jul. 25, 1982" and "Jul. 25, 1982" can be grouped. Another standard allows values written in different units to be grouped. For example, the units of measure "1 m" and "100 cm" can be grouped. Another standard allows values written in different formats to be grouped. For example, the dates "Jul. 25, 1982" and "Jul. 25, 1982" can be grouped. Another standard allows values written in written in different, but approximately equal, units to be grouped. For example, the units of measure "1 m" and "39 inches" can be grouped.

Using the grouping(s), the system performing process 1300 can perform one or more of the following subprocesses in any order to select one group, and hence select a subset of the values from a collection of attribute values.

In a first subprocess, the system performing process 1300 can select the group with the highest "value" for presentation in a structured presentation (step 1310). In some implementation, the "value" of a group is reflects the count of values in that group. In statistical terminology, the system performing process 1200 can select values with high frequencies in the electronic document collection. In effect, this approach allows the documents in an electronic document collection to "vote" on the values of an attribute of an instance.

In other implementations, the "value" of a group not only reflects the count of values but also weights or scores individual counts by parameters that reflect a characteristic of the document from which the values are drawn. For example, a count can be weighted based on, e.g., a page rank of the document from which the values are drawn, a weighting factor for that document provided by a user, the number of other values that have been drawn from that document, or the "age" of the document. For example, documents that have been created more recently can be considered to more accurately characterize the attributes of certain instances.

The approach of this subprocess is effective at eliminating inadvertent mischaracterizations of attributes, e.g., when the value on one electronic document is a typographic error. However, in isolation, this approach can under certain circumstances select inappropriate values. For example, even though a large number of documents characterizes a volume attribute in liters, the viewer may be interested in having that attribute characterized in gallons in a structured presentation.

In a second subprocess, the system performing process 1300 can receive a user specification of a constraint on, e.g., a range of an acceptable value or a unit of an acceptable value (step 1315). For example, the system can provide a GUI component at a display screen such as display 104 (FIG. 1) that allows the user to select a range of values or a unit of measurement constraint. The constraint can be open-ended (e.g., "a value>1") or closed (e.g., "a value between 1 and 10.").

After receiving the constraint, the system performing process 1300 can select the group meeting the received constraint for presentation in a structured presentation (step 1320). For example, if the user selects "meters" as the appropriate unit of measurement, the system performing can select one or more groups of values that are expressed in meters.

The approach of this subprocess is effective at ensuring that the values presented in a structured presentation are presented in an organized, systematic arrangement. For example, the units of measure of the value used to characterize, e.g., Michael Jordan's height can be constrained to be identical to the units of measure of the value used to characterize Magic Johnson's height. Such an organized, systematic arrangement allows a user to compare values of the same attribute of different instances easily, without concern as to units in which the values are presented.

In a third subprocess, the system performing process 1300 can determine a "quality" of the documents from which the attribute values in each group were drawn (step 1325). The "quality" of a document can reflect the likelihood that the information in the document is accurate and does not mischaracterize a value of an attribute. For example, commercial suppliers of goods generally provide accurate information regarding those goods. Hence, the "quality" of information provided by a commercial supplier can be considered higher than the "quality" of information provided by an individual. As another example, bias can be considered in determining the quality of the documents from which the information is drawn. For example, information drawn from an allegedly independent source (such as, e.g., the Congressional Budget Office) can be considered to be higher quality than information drawn from a political party.

As another example, the quality of a document can be based on a specification of the quality of a source of the document, or the document itself, by a user. For example, a user can indicate that automobile reliability information drawn from the Consumer Union (the makers of Consumer Reports) is high quality but that automobile reliability information drawn from Road and Track magazine is not. The system performing process 1300 can also select the group that includes values drawn from the highest quality document(s) (step 1330).

The approach of this subprocess is particularly effective in circumstances where the value of an attribute is the subject of debate. For example, there are disagreements over a variety of values, such as the true height of a collegiate point guard, the best cheesesteak in Philadelphia, and the number of stars awarded to a particular hotel. By allowing a viewer to specify the preferred "high quality" providers of values that characterize such attributes, a structured presentation can be tailored to the expectations of the viewer.

As discussed above, combinations of these and other activities can be performed in order to select one or more values for presentation in a structured presentation. For example, all the groups of values that represent some percentage (e.g., >10%) of the total number of values can be selected in a first screening (step 1310), and these groups can subsequently be further winnowed based on a unit specification (step 1320). The remaining groups can further be winnowed based on the quality of the documents from which the attribute values in each group were drawn (step 1330). Thus, in some implementations, process 1300 can provide one or more values from a remaining group that are free from mischaracterizations, with consistent units of measurement, and drawn from sources that the viewer prefers.

FIG. 14 is a flow chart of a process 1400 for selecting one or more values for presentation in a structured presentation. Process 1400 can be performed in isolation or in conjunction with other activities. For example, process 1400 can be performed at step 1215 in process 1200 (FIG. 12), alone or in conjunction with one or more of the subprocesses of process 1300 (FIG. 13).

The system performing process 1400 can group values of an attribute extracted from two or more documents in an electronic document collection into two or more groups (step 1305). The system performing process 1400 can present descriptions of the groups of values to the user (step 1405). For example, the system can display the most common value in each group, or a list of the some of the values in each group, to the user at a display such as at display screen 104 (FIG. 1). In some implementations, the descriptions of the groups of values can include additional information that characterizes the groups. For example, a number count of the number of values in each group can be displayed, a percentage that reflects the percent of the extracted values that are found in each group can be displayed, and/or a description of the units of measure in the group can be displayed. As another example, an estimate of the quality of the electronic documents from which the values in each group were extracted can be displayed. As yet another example, the identity, location, and/or snippets or other excerpts of documents from which the values in each group were extracted can be displayed.

In some implementations, the descriptions of the groups of values are sorted in a confidence-based ordering. That is, the descriptions of the groups of values are ordered according to how confident the system performing process 1400 is as to the accuracy of the value(s) in each group. The confidence in the accuracy of the value(s) in each group can be determined based on, e.g., the number of values in each group, the quality of the documents from which the values were extracted, and the like.

The system performing process 1400 can receive user selection of a desired group of values (step 1410). For example, the system can receive user interaction that identifies a selection of a desired value group.

In some implementations, the system performing process 1400 can also change other aspects of the structured presentation based on the user selection (step 1415). For example, if a user selects a group of values with a unit of measurement in meters, and there are other values that characterize the same attribute of other instances but that are presented with units of measurement in feet, such values can be converted in the structured presentation 106 to be presented in meters.

FIG. 15 is a flow chart of an example process 1500 for selecting one or more values for presentation in a structured presentation. Process 1500 can be performed in isolation or in conjunction with other activities. For example, process 1500 can be performed at step 1215 in process 1200 (FIG. 12), alone or in conjunction with one or more of the subprocesses of process 1300 (FIG. 13) and/or process 1400 (FIG. 14).

The system performing process 1500 can identify electronic documents in the electronic document collection that are relevant to the instances and other attributes in a structured data collection, such as structured data collection 905 (step 1505). As discussed above, structured data collection 905 can be a version of a structured presentation 106.

Documents that are relevant to the instances and other attributes in a structured data collection can be identified in a variety of ways. For example, the system performing process 1500 can access a data collection that associates instances, their attributes, and values characterizing those attributes, such as attribute/value/instance collection 1005 (FIG. 10). Documents that include information relevant to the instances and other attributes in a structured data collection can be identified therein, e.g., by comparing the identifiers of the instances and the attributes in both data collections. As another example, the system performing process 1500 can use the identifiers of the instances and the attributes as search terms in one or more search queries. Such search queries, alone or in conjunction with other extraction techniques such as language parsing and string comparisons, can be used to identify relevant documents in an electronic document collection.

The system performing process 1500 can also select one or more values for presentation in a structured presentation from the identified documents (step 1510).

FIG. 16 is a schematic representation of a circumstance in which attribute values drawn from electronic documents in electronic document collection 102 are presented to a user in a structured presentation 106. In particular, a system such as system 900 (FIG. 9) draws attribute values from a table 1100 that associates attributes, values, and instances drawn from electronic documents in electronic document collection 102. The system also merges those attribute values with an initial structured presentation 106 to form a final structured presentation 106. The initial structured presentation 106 is thus acting as structured data 905 (FIG. 9).

In the illustrated example, the initial structured presentation has been modified to associate values of a new attribute (i.e., the attribute "AIRPORT") with instances identified in the structured presentation. In particular, a new column 1605 has been added to the initial structured presentation. Column 1605 is headed by an attribute identifier 1610 that identifies the new attribute using the term "AIRPORT." The addition of values of a new attribute to the structured presentation can be triggered, e.g., based on interaction with a user or automatically, as discussed further in the disclosure entitled "RETRIEVING AND DISPLAYING INFORMATION FROM AN UNSTRUCTURED ELECTRONIC DOCUMENT COLLECTION" (U.S. patent application Ser. No. 13/355,228).

A system such as search engine 202 can access a data collection that associates attributes, values, and instances drawn from electronic documents in electronic document collection 102 (such as table 1100). Using such a data collection, the system can select one or more values that characterize the new attribute of one or more of the instances in the initial structured presentation. For example, in the illustrated circumstance, value 1615 (i.e., the value "value_ai") characterizes the attribute "AIRPORT" of the instance "NEW YORK" in the document "DOC_3." If necessary, the system can select one or more values of the new attribute for display, e.g., using one or more of processes 1300, 1400, 1500 (FIGS. 13, 14, 15).

After a value that characterizes the new attribute of one or more of the instances in the initial structured presentation has been selected, a final structured presentation 106 can be presented to a viewer. The final structured presentation 106 can include the selected values that characterize the new attribute of one or more of the instances in the structured presentations. For example, as shown, value 1615 can be presented in final structured presentation 106 to a viewer.

FIG. 17 is a schematic representation of a process 1700 in which both attributes and attribute values are drawn from electronic documents in an electronic document collection and presented to a user in a structured presentation.

In process 1700, an initial structured data collection 905 can include an preexisting structured presentation 1705. The preexisting structured presentation 1705 can characterize instances using one or more attribute values, e.g., such as the attribute values in column 1710. New attributes that characterize the instances in preexisting structured presentation 1705 can be formulated based on the content of electronic documents in electronic document collection 102, as described in the disclosure entitled "ADDING NEW ATTRIBUTES TO A STRUCTURED PRESENTATION" (U.S. patent application Ser. No. 13/355,607). The new attributes can be added at step 1715 to preexisting structured presentation 1705 and appear as part of a structured presentation 1720. New values of such attributes can be formulated based on the content of electronic documents in electronic document collection 102, as described herein. The new values can be added at step 1725 to preexisting structured presentation 1705 and appear as part of a structured presentation 1720. In particular, in the illustrated example, a new column 1730 can include an new attribute identifier 308 (namely, attribute identifier 1735) that identifies the new attribute and a new collection of attribute values 307 (namely, attribute values 1740, 1745) that characterize the new attribute. In effect, the contents of preexisting structured presentation 1705 have been merged with content drawn from electronic document collection 102.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a stand alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processor suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. Accordingly, other implementations are within the scope of the following claims.

What is claimed is:

1. A machine-implemented method comprising:
    obtaining a plurality of instances and a plurality of attributes, wherein each instance has one or more attributes of the plurality of attributes as attributes of the instance;
    for each attribute of an instance:
        identifying a plurality documents from an unstructured document collection that are relevant to the instance, where each of the documents include at least a value for the attribute of the instance;
        grouping values of the attribute of the instance into two or more groups; and
        establishing a subset of the one or more values of the attribute as characterizing the instance including selecting one group of values from the two or more groups; and
    adding each instance, the respective attributes of each instance, and the respective subset of values for the corresponding attributes to a structured data collection.

2. The method of claim 1, where establishing the subset comprises selecting the subset based at least in part on a count of values in each group.

3. The method of claim 1, where establishing the subset comprises selecting the group based at least in part on values in the group meeting a user-specified constraint.

4. The method of claim 1, where establishing the subset comprises selecting the group based at least in part on a value in the group being drawn from a high quality document.

5. The method of claim 1, where establishing the subset comprises selecting the group based at least in part on a value in the group being drawn from a document relevant to another instance in the structured data collection.

6. The method of claim 1, where establishing the subset comprises selecting the group based at least in part on a value in the group being drawn from a document relevant to another attribute in the structured data collection.

7. The method of claim 1, further comprising:
    extracting a first candidate value of a first attribute of a first instance from a first electronic document;
    extracting a second candidate value of the first attribute of the first instance from a second electronic document;
    determining a first likelihood that the first candidate value correctly characterizes the first attribute of the first instance;
    determining a second likelihood that the second candidate value correctly characterizes the first attribute of the first instance;
    determining that the first likelihood is higher than the second likelihood; and
    establishing, in response to determining that the first likelihood is higher than the second likelihood, the first candidate value rather than the second candidate value as characterizing the first instance in the structured data collection.

8. The method of claim 7, where the first likelihood and the second likelihood are determined based on a number of times that the respective candidate value is used to characterize the respective attribute of the respective instance.

9. The method of claim 7, where the first likelihood and the second likelihood are determined based on quality of documents from which the respective candidate value is used to characterize the respective attribute of the respective instance.

10. A system comprising:
a processor; and
computer-readable medium coupled to the processor and having instructions stored thereon, which, when executed by the processor, cause the processor to perform operations comprising:
obtaining a plurality of instances and a plurality of attributes, wherein each instance has one or more attributes of the plurality of attributes as attributes of the instance;
for each attribute of an instance:
identifying a plurality documents from an unstructured document collection that are relevant to the instance, where each of the documents include at least a value for the attribute of the instance;
grouping values of the attribute of the instance into two or more groups; and
establishing a subset of the one or more values of the attribute as characterizing the instance including selecting one group of values from the two or more groups; and
adding each instance, the respective attributes of each instance, and the respective subset of values for the corresponding attributes to a structured data collection.

11. The system of claim 10, where establishing the subset comprises selecting the subset based at least in part on a count of values in each group.

12. The system of claim 10, where establishing the subset comprises selecting the group based at least in part on values in the group meeting a user-specified constraint.

13. The system of claim 10, where establishing the subset comprises selecting the group based at least in part on a value in the group being drawn from a high quality document.

14. The system of claim 10, where establishing the subset comprises selecting the group based at least in part on a value in the group being drawn from a document relevant to another instance in the structured data collection.

15. The system of claim 10, where establishing the subset comprises selecting the group based at least in part on a value in the group being drawn from a document relevant to another attribute in the structured data collection.

16. The system of claim 10, further comprising:
extracting a first candidate value of a first attribute of a first instance from a first electronic document;
extracting a second candidate value of the first attribute of the first instance from a second electronic document;
determining a first likelihood that the first candidate value correctly characterizes the first attribute of the first instance;
determining a second likelihood that the second candidate value correctly characterizes the first attribute of the first instance;
determining that the first likelihood is higher than the second likelihood; and
establishing, in response to determining that the first likelihood is higher than the second likelihood, the first candidate value rather than the second candidate value as characterizing the first instance in the structured data collection.

17. The system of claim 16, where the first likelihood and the second likelihood are determined based on a number of times that the respective candidate value is used to characterize the respective attribute of the respective instance.

18. The system of claim 16, where the first likelihood and the second likelihood are determined based on quality of documents from which the respective candidate value is used to characterize the respective attribute of the respective instance.

19. A computer-readable medium having instructions stored thereon, which, when executed by a processor, cause the professor to perform observations comprising:
obtaining a plurality of instances and a plurality of attributes, wherein each instance has one or more attributes of the plurality of attributes as attributes of the instance;
for each attribute of an instance:
identifying a plurality documents from an unstructured document collection that are relevant to the instance, where each of the documents include at least a value for the attribute of the instance;
grouping values of the attribute of the instance into two or more groups; and
establishing a subset of the one or more values of the attribute as characterizing the instance including selecting one group of values from the two or more groups; and
adding each instance, the respective attributes of each instance, and the respective subset of values for the corresponding attributes to a structured data collection.

20. The computer-readable medium of claim 19, where establishing the subset comprises selecting the subset based at least in part on a count of values in each group.

21. The computer-readable medium of claim 19, where establishing the subset comprises selecting the group based at least in part on values in the group meeting a user-specified constraint.

22. The computer-readable medium of claim 19, where establishing the subset comprises selecting the group based at least in part on a value in the group being drawn from a high quality document.

23. The computer-readable medium of claim 19, where establishing the subset comprises selecting the group based at least in part on a value in the group being drawn from a document relevant to another instance in the structured data collection.

24. The computer-readable medium of claim 19, where establishing the subset comprises selecting the group based at least in part on a value in the group being drawn from a document relevant to another attribute in the structured data collection.

25. The computer-readable medium of claim 19, further comprising:
extracting a first candidate value of a first attribute of a first instance from a first electronic document;
extracting a second candidate value of the first attribute of the first instance from a second electronic document;
determining a first likelihood that the first candidate value correctly characterizes the first attribute of the first instance;
determining a second likelihood that the second candidate value correctly characterizes the first attribute of the first instance;
determining that the first likelihood is higher than the second likelihood; and
establishing, in response to determining that the first likelihood is higher than the second likelihood, the first candidate value rather than the second candidate value as characterizing the first instance in the structured data collection.

26. The computer-readable medium of claim 25, where the first likelihood and the second likelihood are determined based on a number of times that the respective candidate value is used to characterize the respective attribute of the respective instance.

27. The computer-readable medium of claim 25, where the first likelihood and the second likelihood are determined based on quality of documents from which the respective candidate value is used to characterize the respective attribute of the respective instance.

\* \* \* \* \*